(12) United States Patent
Katsurada et al.

(10) Patent No.: US 12,496,459 B2
(45) Date of Patent: Dec. 16, 2025

(54) LIGHT IRRADIATION DEVICE AND LIGHT IRRADIATION SYSTEM

(71) Applicant: ASAHI INTECC CO., LTD., Seto (JP)

(72) Inventors: Yuko Katsurada, Seto (JP); Toshihiko Tsukamoto, Seto (JP); Kotaro Mizukami, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 422 days.

(21) Appl. No.: 18/103,738

(22) Filed: Jan. 31, 2023

(65) Prior Publication Data

US 2023/0166123 A1 Jun. 1, 2023

Related U.S. Application Data

(63) Continuation of application No. PCT/JP2020/029974, filed on Aug. 5, 2020.

(51) Int. Cl.
*A61N 5/06* (2006.01)

(52) U.S. Cl.
CPC ...... *A61N 5/0601* (2013.01); *A61N 2005/063* (2013.01); *A61N 2005/0632* (2013.01)

(58) Field of Classification Search
CPC ............ A61N 5/0601; A61N 2005/063; A61N 2005/0632; A61N 5/062; A61N 2005/0665; A61B 2018/2244; A61B 2018/2272
See application file for complete search history.

(56) References Cited

U.S. PATENT DOCUMENTS

| 5,163,935 | A | 11/1992 | Black et al. |
| 5,354,294 | A | 10/1994 | Chou |
| 9,662,173 | B1 | 5/2017 | Griffin |
| 2009/0052849 | A1 | 2/2009 | Lee et al. |
| 2009/0190883 | A1* | 7/2009 | Kato ...................... G02B 6/327 385/33 |

(Continued)

FOREIGN PATENT DOCUMENTS

| JP | 2006215007 A | * | 8/2006 |
| JP | 2007-528752 A | | 10/2007 |

(Continued)

OTHER PUBLICATIONS

Mitsunaga, M. et al., "Cancer Cell-Selective In Vivo Near Infrared Photoimmunotherapy Targeting Specific Membrane Molecules," Nat Med.; 17(12): 1685-1691; Jun. 1, 2012.

(Continued)

*Primary Examiner* — Carl H Layno
*Assistant Examiner* — Dhrasti Snehal Dalal
(74) *Attorney, Agent, or Firm* — Oliff PLC

(57) ABSTRACT

A light irradiation device including an optical fiber and a light transmissive optical path changing member for changing an optical path of light entering from the optical fiber, disposed on a distal side relative to the optical fiber. The optical path changing member includes a proximal side member disposed on a proximal side of the optical path changing member and a distal side member disposed on a distal side of the optical path changing member. The proximal side member and the distal side member are in contact with each other to form a boundary surface, and the boundary surface is inclined relative to a vertical plane of a central axis of the optical fiber.

13 Claims, 25 Drawing Sheets

(56) References Cited

U.S. PATENT DOCUMENTS

| | | | | |
|---|---|---|---|---|
| 2011/0176770 | A1* | 7/2011 | Zerfas | G02B 6/262 |
| | | | | 385/39 |
| 2011/0255828 | A1 | 10/2011 | Sudarshanam | |
| 2014/0031679 | A1* | 1/2014 | Tashiro | A61B 5/0077 |
| | | | | 600/425 |
| 2017/0135765 | A1 | 5/2017 | Griffin et al. | |
| 2018/0008122 | A1 | 1/2018 | Arai et al. | |
| 2018/0214008 | A1 | 8/2018 | Yamazoe et al. | |
| 2020/0008873 | A1* | 1/2020 | Pinnow | A61B 18/24 |

FOREIGN PATENT DOCUMENTS

| | | |
|---|---|---|
| JP | 2009-178229 A | 8/2009 |
| JP | 2014-094122 A | 5/2014 |
| JP | 2014-523907 A | 9/2014 |
| JP | 2016-097078 A | 5/2016 |
| JP | 2018-000867 A | 1/2018 |
| WO | 2005/007216 A2 | 1/2005 |
| WO | 2010075368 A1 | 7/2010 |
| WO | 2012/147379 A1 | 11/2012 |
| WO | 2013/009475 A1 | 1/2013 |

OTHER PUBLICATIONS

Sato, K. et al., "Spatially selective depletion of tumor-associated regulatory T cells with near-infrared photoimmunotherapy," Science Translational Medicine, vol. 8, Issue 352, Aug. 17, 2016.

Okuyama, S., et al., "Interstitial near-infrared photoimmunotherapy: effective treatment areas and light doses needed for use with fiber optic diffusers," Oncotarget, vol. 9, No. 13, pp. 11159-11169, Jan. 27, 2018.

* cited by examiner

Fig. 5

| ITEM NUMBER | n1 | n2 | NA | θb(°) |
|---|---|---|---|---|
| 1 | 2 | 1.3 | 0.5 | 63.93 |
| 2 | 2 | 1.4 | 0.5 | 60.05 |
| 3 | 2 | 1.99 | 0.5 | 20.2 |
| 4 | 1.31 | 1.3 | 0.5 | 29.52 |
| 5 | 1.4 | 1.3 | 0.5 | 42.71 |
| 6 | 2 | 1.3 | 0.5 | 63.93 |
| 7 | 2 | 1.3 | 0.1 | 52.32 |
| 8 | 2 | 1.4 | 0.1 | 48.43 |
| 9 | 2 | 1.99 | 0.1 | 8.59 |
| 10 | 1.31 | 1.3 | 0.1 | 11.46 |
| 11 | 1.4 | 1.3 | 0.1 | 25.88 |
| 12 | 2 | 1.3 | 0.1 | 52.32 |

Fig. 7

| ITEM NUMBER | n1 | n2 | NA | θb(°) |
|---|---|---|---|---|
| 21 | 4 | 1.3 | 0.5 | 78.21 |
| 22 | 4 | 1.4 | 0.5 | 76.69 |
| 23 | 4 | 3.99 | 0.5 | 11.23 |
| 24 | 1.31 | 1.3 | 0.5 | 29.52 |
| 25 | 1.4 | 1.3 | 0.5 | 42.71 |
| 26 | 4 | 1.3 | 0.5 | 78.21 |
| 27 | 4 | 1.3 | 0.1 | 72.46 |
| 28 | 4 | 1.4 | 0.1 | 70.94 |
| 29 | 4 | 3.99 | 0.1 | 5.48 |
| 30 | 1.31 | 1.3 | 0.1 | 11.46 |
| 31 | 1.4 | 1.3 | 0.1 | 25.88 |
| 32 | 4 | 1.3 | 0.1 | 72.46 |

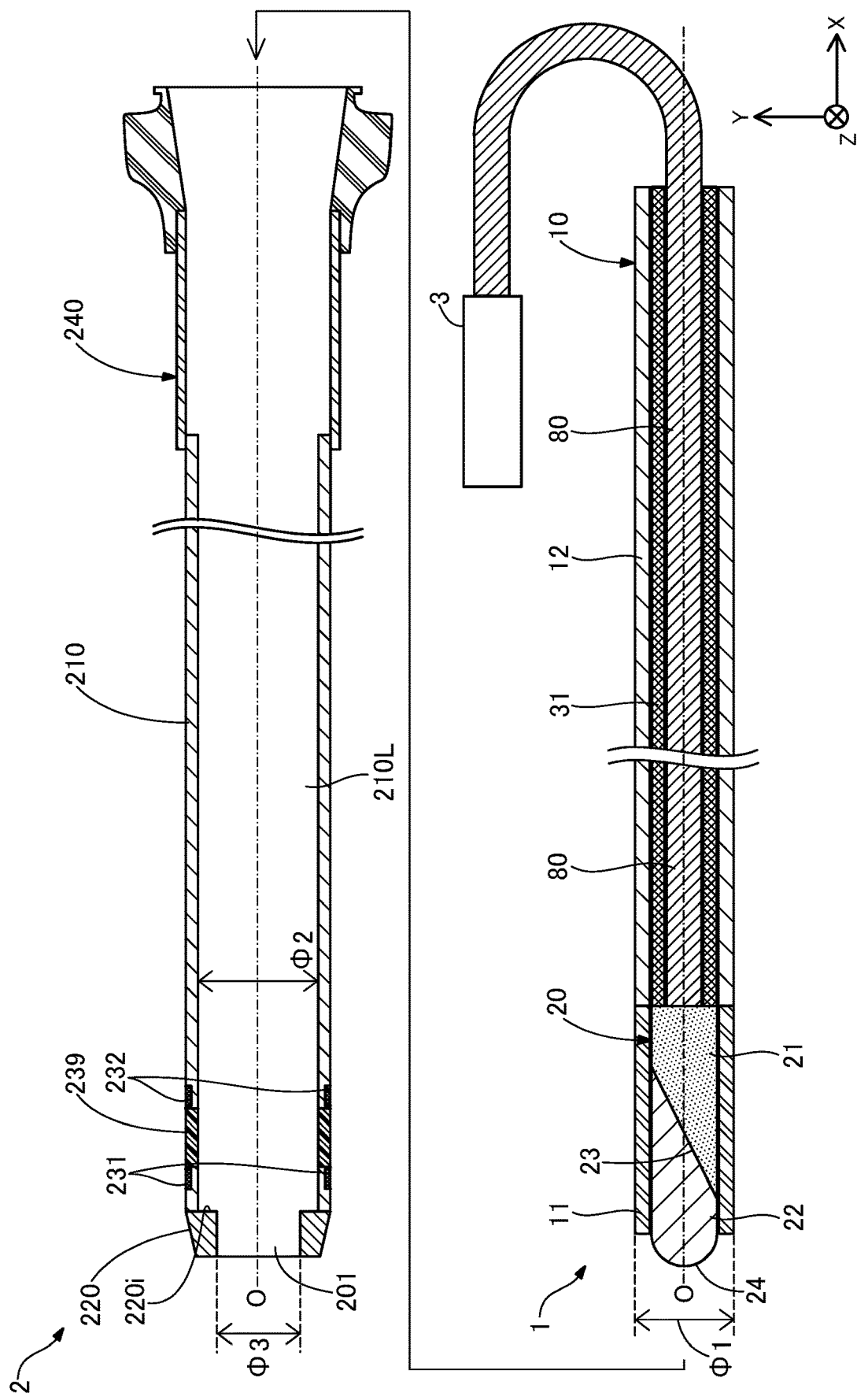

LIGHT IRRADIATION DEVICE AND LIGHT IRRADIATION SYSTEM

CROSS REFERENCE TO RELATED APPLICATION

This application is a continuation application of International Application No. PCT/JP2020/029974, filed Aug. 5, 2020. The content of this application is incorporated herein by reference in its entirety.

TECHNICAL FIELD

This application relates to a light irradiation device and a light irradiation system.

BACKGROUND

In cancer treatments, surgical, radiological, and pharmacological (chemical) methods are used alone or in combination, and each technique has been developed in recent years. However, there are still many cancers for which satisfactory treatment techniques have not been found, and further development of treatment techniques is expected. A method called PDT (photodynamic therapy) is known as one of the cancer treatment techniques. In PDT, a photosensitizer is administered intravenously and then irradiated with light to generate active oxygen in cancer cells, thereby killing the cancer cells (e.g., refer to Non Patent Literature 1). However, PDT is not widely used as a treatment technique because of its low selective accumulation of photosensitizers in cancer cells and high side effects caused by intake of the photosensitizers into normal cells.

Regarding this, NIR-PIT (Near-infrared photoimmunotherapy) is one of the treatment techniques that has been attracting attention in recent years. NIR-PIT uses a complex in which two compounds, an antibody against a cancer cell-specific antigen and a photosensitizer (e.g., IRDye700DX), are bound to each other. This complex is selectively accumulated in the cancer cells in the body when administered intravenously. After that, the complex is activated by being irradiated with light having an excitation wavelength (e.g., 690 nm) of the photosensitizer in the complex to exhibit an anticancer effect (e.g., refer to Patent Literature 1). In NIR-PIT, side effects can be reduced compared to PDT due to the selective accumulation of the antibodies into the cancer and local light irradiation. Further, in NIR-PIT, light irradiation (NIR irradiation) is performed in a near-infrared region of 690 nm, for example. As a result, NIR irradiation can be expected to act on the immune system (e.g., refer to Non Patent Literature 2).

A specific wavelength range including 690 nm exemplified in the above is called the "biological optical window", and it is a wavelength range in which less light is absorbed by biological components than other wavelength ranges. However, the light irradiation from the body surface results in poor light penetration, causing a problem of not being able to apply the light to cancer deep inside the body. Thus, in recent years, research has been conducted on NIR-PIT in which light irradiation is performed at a position closer to cancer cells instead of performing the light irradiation from the body surface (e.g., refer to Non Patent Literature 3). For example, Patent Literatures 2 and 3 disclose devices that can be used in such PDT and NIR-PIT. These devices are inserted into a biological lumen such as the blood vessel to emit light transmitted via an optical fiber deep inside the body. For example, Patent Literature 4 discloses a device for obtaining a tomographic image of a biological tissue for the purpose of diagnosing the biological tissue by inserting the device into a biological lumen such as the blood vessel and emitting light transmitted via an optical fiber deep inside the body.

CITATION LIST

Patent Literature

Patent Literature 1: JP 2014-523907 W
Patent Literature 2: JP 2018-867 A
Patent Literature 3: JP 2007-528752 W
Patent Literature 4: JP 2014-94122 A

Non-Patent Literature

Non Patent Literature 1: Makoto Mitsunaga, Mikako Ogawa, Nobuyuki Kosaka, Lauren T. Rosenblum, Peter L. Choyke, and Hisataka Kobayashi, Cancer Cell-Selective In Vivo Near Infrared Photoimmunotherapy Targeting Specific Membrane Molecules, Nature Medicine 2012 17(12): p. 1685-1691.

Non Patent Literature 2: Kazuhide Sato, Noriko Sato, Biying Xu, Yuko Nakamura, Tadanobu Nagaya, Peter L. Choyke, Yoshinori Hasegawa, and Hisataka Kobayashi, Spatially selective depletion of tumor-associated regulatory T cells with near-infrared photoimmunotherapy, Science Translational Medicine 2016 Vol. 8 Issue 352, ra110.

Non Patent Literature 3: Shuhei Okuyama, Tadanobu Nagaya, Kazuhide Sato, Fusa Ogata, Yasuhiro Maruoka, Peter L. Choyke, and Hisataka Kobayashi, Interstitial near-infrared photoimmunotherapy: effective treatment areas and light doses needed for use with fiber optic diffusers, Oncotarget 2018 Feb. 16; 9(13): p. 11159-11169.

SUMMARY

Technical Problem

In general, an optical fiber transmits light by total reflection of light using a difference in refractive index between a core and a clad covering the outer peripheral surface of the core and emits the light from the core exposed at the distal end. On the other hand, in a device that is inserted into a biological lumen and emits light deep inside the body, a direction of the light irradiation is preferably a direction of the tissue surrounding the biological lumen, that is, a direction that intersects a central axis of the device (and the optical fiber). In this regard, in the device described in Patent Literature 4, an optical element (prism) disposed on the distal side relative to the optical fiber is used to change an optical path of the light transmitted from the optical fiber, thereby making it possible to emit the light in the direction intersecting the central axis of the device.

However, in the device described in Patent Literature 4, a reflection surface of the optical element used for changing the optical path is a boundary surface between the optical element and the air. Thus, in order to change the optical path of the light transmitted from the optical fiber and emit the light in the direction intersecting the central axis of the device, the optical element needs to be formed in a shape sharpened from the proximal side to the distal side, causing a poor safety problem. Further, with the device described in Patent Literature 4, when the device is inserted into the blood vessel, for example, there is a risk of air embolism in the blood vessel. Further, when the blood enters inside the device, the air is replaced by the blood and the blood is then heated by absorption of light, which may cause blood coagulation. The device described in Patent Literature 4 has poor safety problems also in these points. Further, in the devices described in Patent Literature 2 and Patent Literature 3, no consideration is given for emitting the light in the direction intersecting the central axes of the devices.

Note that such problems are not limited to PDT and NIR-PIT but are also common to all devices used in examination or treatments including a process of emitting light in the body (e.g., examination or treatments for cerebral aneurysm, arrhythmia, Alzheimer's disease, etc.). This light is not limited to the specific wavelength region including 690 nm as exemplified in the above but also includes infrared light in a wavelength region larger than 780 nm. Further, such problems are not limited to the devices inserted into the blood vessels but also common to all devices inserted into the biological lumens such as the vascular system, the lymphatic system, the biliary system, the urinary system, the respiratory system, the digestive system, the secretory glands, and the reproductive organs.

The disclosed embodiments have been made to solve at least a part of the above-mentioned problems, and an object of the disclosed embodiments is to improve safety in a light irradiation device that can emit light from an optical fiber in a direction intersecting a central axis of the device.

Solution to Problem (1) According to one aspect of the disclosed embodiments, a light irradiation device is provided. This light irradiation device includes an optical fiber and a light transmissive optical path changing member for changing an optical path of light entered from the optical fiber, disposed on a distal side relative to the optical fiber. The optical path changing member includes a proximal side member disposed on a proximal side of the optical path changing member and a distal side member disposed on a distal side of the optical path changing member. The proximal side member and the distal side member are in contact with each other to form a boundary surface, and the boundary surface is inclined relative to a vertical plane of a central axis of the optical fiber.

According to this configuration, the optical path changing member includes the boundary surface where the proximal side member and the distal side member are in contact with each other and which is inclined relative to the vertical plane of the central axis of the optical fiber. The optical path changing member changes the optical path of the light entered from the optical fiber using this boundary surface. Thus, the light from the optical fiber can be emitted in the direction intersecting the central axis of the device without bending the optical fiber, in other words, while preventing a light loss that occurs when the optical fiber is bent. Further, the boundary surface that changes the optical path of the light entered from the optical fiber is the surface where the proximal side member and the distal side member are in contact with each other. Thus, even when the light irradiation device is inserted into the blood vessel, for example, there is no risk of air embolism in the blood vessel. Further, since both the proximal side member and the distal side member have a light transmitting property, there is no risk that the proximal side member or the distal side member absorbs the light and generates heat. Further, even if the blood enters inside the device, the air is not replaced with the blood, so that it becomes possible to reduce a risk of heating the blood and causing blood coagulation due to light absorption. Thus, the device is excellent in safety. Further, in the optical path changing member having the distal side member on the distal side of the boundary surface, a distal portion of the distal side member is formed in a shape with high safety (e.g., a curved shape having a certain radius R), which can further improve the safety of the light irradiation device inserted into the biological lumen. Further, in the optical path changing member having the distal side member on the distal side of the boundary surface, it is possible to improve the strength of the distal side of the optical path changing member and prevent a damage to the optical path changing member.

(2) In the light irradiation device of the above aspect, at least a part of the boundary surface, irradiated with the light from the optical fiber, may be a flat surface inclined relative to the vertical plane.

According to this configuration, at least a part of the boundary surface for changing the optical path of the light entered from the optical fiber, irradiated with the light from the optical fiber, is the flat surface inclined relative to the vertical plane. Thus, the light entered from the optical fiber can be easily totally reflected by adjusting an inclination angle of the boundary surface. Further, at least a part of the boundary surface, irradiated with the light from the optical fiber, is formed in the flat surface, so that there is little effect of axial misalignment of the optical fiber in the light irradiation device, and the proximal side member and the distal side member can be easily produced.

(3) In the light irradiation device of the above aspect, when NA is defined by the numerical aperture of the optical fiber, n1 is defined by the refractive index of the proximal side member, n2 is defined by the refractive index of the distal side member, and an inclination angle $\theta b$ of the boundary surface is defined by an acute angle formed between the central axis of the optical fiber and the boundary surface in the longitudinal section of the optical path changing member, the inclination angle $\theta b$ may be in a range of $0 < \theta b \leq \pi/2 + [\arcsin(NA/n1)] - [\arcsin(n2/n1)]$.

According to this configuration, the inclination angle $\theta b$ of the boundary surface in the longitudinal section of the optical path changing member (i.e., the acute angle $\theta b$ formed between the central axis of the optical fiber and the boundary surface) is in the rage of $0 < \theta b \leq \pi/2 + [\arcsin(NA/n1)] - [\arcsin(n2/n1)]$, so that at least a fraction of the light entering the boundary surface from the optical fiber can be totally reflected and emitted in the direction intersecting the central axis of the light irradiation device.

(4) In the light irradiation device of the above aspect, the inclination angle $\theta b$ may be in a range of $0° < \theta b < 64°$, the numerical aperture NA may be in a range of $0.1 \leq NA \leq 0.5$, and the refractive index n1 and the refractive index n2 may be in a range of $1.3 \leq n2 < n1 \leq 2.0$.

According to this configuration, the whole light including visible light entered from the optical fiber can be transmitted in the optical path changing member (the proximal side member and the distal side member), and at least a fraction of the light entered from the optical fiber can be totally reflected on the boundary surface of the optical path changing member.

(5) In the light irradiation device of the above aspect, a wavelength $\lambda$ of the light from the optical fiber may be in a range of 780 nm $< \lambda <$ 1 mm, the inclination angle $\theta b$ may be in a range of $0° < \theta b < 79°$, the numerical aperture NA may be in a range of $0.1 \leq NA \leq 0.5$, and the refractive index n1 and the refractive index n2 may be in a range of $1.3 \leq n2 < n1 \leq 4.0$.

According to this configuration, infrared light (i.e., light with a wavelength in a range of 780 nm<wavelength λ<1 mm) entered from the optical fiber can be transmitted in the optical path changing member (the proximal side member and the distal side member), and at least a fraction of the light entered from optical fiber can be totally reflected by the boundary surface of the optical path changing member.

(6) In the light irradiation device of the above aspect, the distal portion of the distal side member may be formed in a curved shape having a certain radius R.

According to this configuration, the distal portion of the distal side member disposed on the distal side of the boundary surface is formed in the curved shape having a certain radius R. Thus, the safety of the light irradiation device can be improved as compared with a case where the optical element is formed in a shape sharpened from the proximal side toward the distal side, for example.

(7) In the light irradiation device of the above aspect, a region of the outer peripheral surface of the proximal side member, through which the light reflected by the boundary surface passes, may be formed in a spherical shape.

According to this configuration, the region of the outer peripheral surface of the proximal side member, through which the light reflected by the boundary surface passes, is formed in the spherical shape. Thus, it becomes possible to increase a light output of the light emitted from the light irradiation device to the biological tissue by condensing the reflected light that has passed through the spherical surface. Further, the reflected light that has passed through the spherical surface can be collimated, that is, the light beams emitted from the light irradiation device to the biological tissue can be formed in parallel. As described above, when the region of the outer peripheral surface of the proximal side member, through which the light reflected by the boundary surface passes, is formed in the spherical shape, it becomes possible to control an irradiation range of the light emitted from the light irradiation device to the biological tissue.

(8) The light irradiation device of the above aspect may further include a light transmissive spacing portion which is disposed between the optical fiber and the optical path changing member and transmits the light entered from the optical fiber to the optical path changing member.

According to this configuration, the light transmissive spacing portion is disposed between the optical fiber and the optical path changing member. Thus, the followability of the light irradiation device can be improved by adjusting the rigidity of the spacing portion.

(9) According to one aspect of the disclosed embodiments, a light irradiation system is provided. The light irradiation system includes the light irradiation device having the above configuration and a catheter into which the light irradiation device is inserted. The catheter includes a light transmitting portion which is disposed at a position covering the outer peripheral surface of the proximal side member and transmits the light reflected by the boundary surface when the light irradiation device is inserted into the catheter.

According to this configuration, the light irradiation system separately includes the light irradiation device and the catheter having the light transmitting portion that transmits the light reflected by the boundary surface of the light irradiation device. Thus, it becomes possible to improve flexibility in device design and expand a range of procedures.

Note that the disclosed embodiments can be implemented in various aspects such as, for example, a guide wire as the light irradiation device, a catheter as the light irradiation device, a light irradiation system including the light irradiation system and the catheter, and production methods thereof.

BRIEF DESCRIPTION OF DRAWINGS

FIG. 5 is a diagram for describing an inclination angle θb of a boundary surface in a case where the whole light including visible light is used.

FIG. 7 is a diagram for describing the inclination angle θb of the boundary surface in a case where infrared light is use.

FIG. 25 is an explanatory diagram exemplifying a configuration of a light irradiation system of a fifteenth embodiment.

DETAILED DESCRIPTION

First Embodiment

Figure 1:
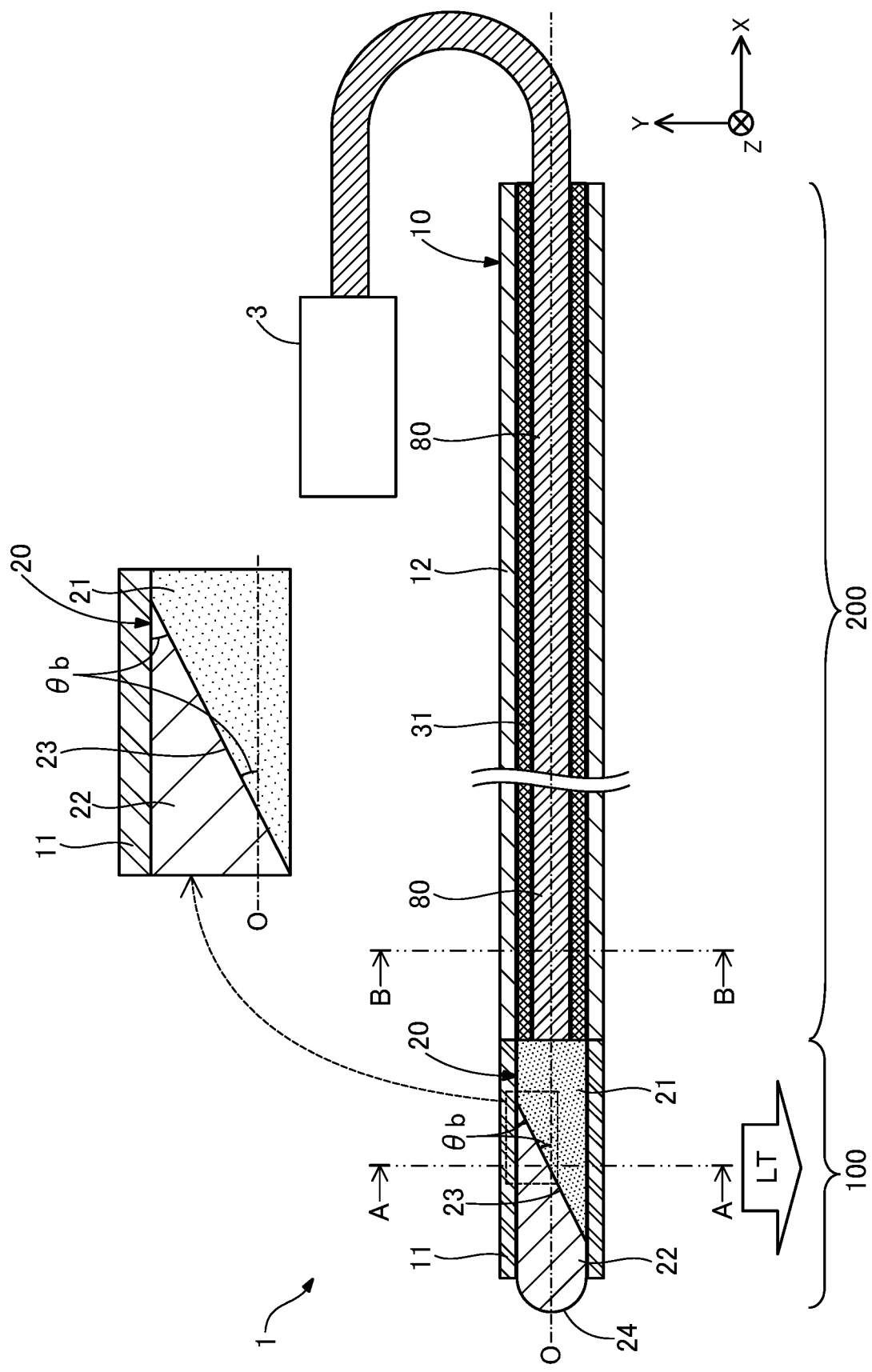
FIG. 1 an explanatory diagram exemplifying a configuration of a light irradiation device of a first embodiment.

FIG. 1 is an explanatory diagram exemplifying a configuration of a light irradiation device 1 of a first embodiment. The light irradiation device 1 is used by being inserted into biological lumens such as the blood vessel system, the lymphatic system, the biliary system, the urinary system, the respiratory system, the digestive system, the secretory glands, and the reproductive organs. The light irradiation system is a device that emits light from inside the biological lumen toward the biological tissue. It is used in, for example, PDT (photodynamic therapy) and NIR-PIT (near-infrared photoimmunotherapy). The light irradiation device 1 of the present embodiment is a probe body including a light irradiation portion 100 that emits light LT in a lateral direction of the light irradiation device 1 (in other words, in a direction intersecting a central axis of the light irradiation device 1). As shown in FIG. 1, the light irradiation device 1 includes the light irradiation portion 100 and an extending portion 200 from a distal side to a proximal side.

In FIG. 1, an axis passing through the center of the light irradiation device 1 is represented by an axis O (a dash-dotted line). In the example in FIG. 1, the axis O coincides with the axis passing through the center of the light irradiation device 1 and each constituent member thereof. However, the axis O may be different from the central axis of the light irradiation device 1 and each constituent member thereof. FIG. 1 shows mutually orthogonal X, Y, and Z axes. The X axis corresponds to the longitudinal direction of the light irradiation device 1 (direction of the axis O), the Y axis corresponds to the height direction of the light irradiation device 1, and the Z axis corresponds to the width direction of the light irradiation device 1. The left side (−X-axis direction) of FIG. 1 is referred to as a "distal side" of the light irradiation device 1 and each constituent member thereof, and the right side (+X-axis direction) of FIG. 1 is referred to as a "proximal side" of the light irradiation device 1 and each constituent member thereof. Regarding the light irradiation device 1 and each constituent member thereof, an end portion located on the distal side is referred to as a "distal end", and the distal end and a vicinity thereof are referred to as a "distal portion". Further, an end portion located on the proximal side is referred to as a "proximal end", and the proximal end and a vicinity thereof are referred to as a "proximal portion". The distal side is inserted into the living body, and the proximal side is operated by an operator such as a medical doctor. These points are common in FIG. 1 and subsequent drawings.

Figure 2:
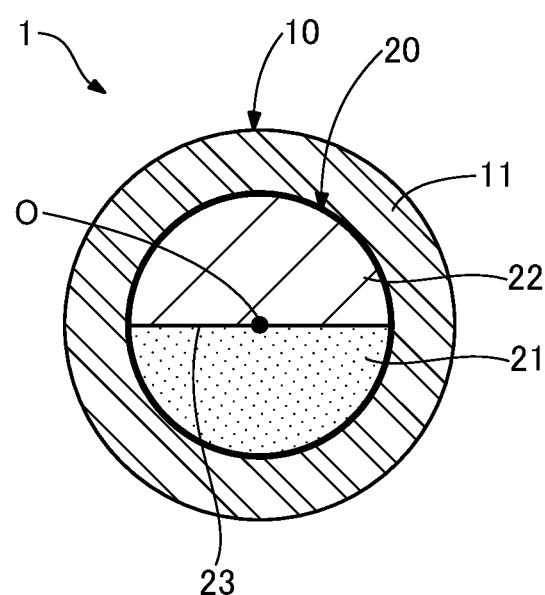
FIG. 2 is an explanatory diagram exemplifying a cross-sectional configuration along a line A-A in FIG. 1.

FIG. 2 is an explanatory diagram exemplifying a cross-sectional configuration along a line A-A in FIG. 1. As shown in FIG. 1, the light irradiation portion 100 is a portion disposed on the distal side of the light irradiation device 1 and includes a light transmitting portion 11 and an optical path changing member 20.

The optical path changing member 20 is a light transmissive member that changes an optical path of light entered from an optical fiber 80. The term "light transmissive" described herein means a property of transmitting light entered from the outside. The optical path changing member 20 is a solid, substantially cylindrical member that extends along the axis O of the light irradiation device 1 and has a substantially constant outer diameter from the proximal side to the distal side. The optical path changing member 20 is disposed in contact with a core of the optical fiber 80 on the distal side relative to the optical fiber 80. The term "contact" described herein means both a state in which the core of the optical fiber 80 and the optical path changing member 20 are disposed adjacent to each other and a state in which the core of the optical fiber 80 is embedded in the optical path changing member 20.

The optical path changing member 20 includes a distal side member 22 and a proximal side member 21. The distal side member 22 is disposed on the distal side of the optical path changing member 20. A distal portion 24 of the distal side member 22 is formed in a curved shape having a certain radius R. In the illustrated example, the distal portion 24 is formed in a hemispherical shape. However, the size of R given to the distal portion 24 can be freely changed, and the distal portion 24 does not have to be formed in the hemispherical shape. A proximal portion of the distal side member 22 has an inclined surface that is inclined relative to a vertical plane of the central axis O of the optical fiber 80 (i.e., the YZ plane along the line A-A in FIG. 1). In the illustrated example, the inclined surface of the distal side member 22 is a flat surface with no curvature. The distal side member 22 has a light transmitting property, and a refractive index n2 of the distal side member 22 is 1.3 or more. Note that the refractive index n2 may be less than 1.3 as long as it is greater than the refractive index of the air. The outer diameter and the length in the X-axis direction of the distal side member 22 can be freely determined.

The proximal side member 21 is disposed on the proximal side of the optical path changing member 20. A distal portion of the proximal side member 21 has an inclined surface that is inclined, at the same angle and in the same direction as the distal side member 22, relative to the vertical plane of the central axis O of the optical fiber 80 (i.e., the YZ plane along the line A-A in FIG. 1). The inclined surface of the proximal side member 21 is a flat surface with no curvature. Here, as shown in FIG. 1 and FIG. 2, the inclined surface of the distal side member 22 and the inclined surface of the proximal side member 21 are in contact with each other to form a boundary surface 23. That is, the boundary surface 23 is inclined relative to the vertical plane of the central axis O of the optical fiber 80 (i.e., the YZ plane along the line AA in FIG. 1). The core of the optical fiber 80 is in contact with a proximal portion of the proximal side member 21. The proximal side member 21 has the light transmitting property, and a refractive index n1 of the proximal side member 21 is 1.3 or more. Note that the refractive index n1 may be less than 1.3 as long as it is greater than the refractive index of the air. The outer diameter and the length in the X-axis direction of the proximal side member 21 can be freely determined. The outer diameter and the length of the proximal side member 21 may be the same as or different from those of the distal side member 22.

Here, in the longitudinal section shown in FIG. 1, an acute angle θb formed between the central axis O of the optical fiber 80 and the boundary surface 23 of the optical path changing member 20 is referred to as an "inclination angle θb of the boundary surface 23". Note that, as shown in the enlarged sectional view in the rectangular frame at the top of FIG. 1, in the longitudinal section shown in FIG. 1, the acute angle formed between the axis O and the boundary surface 23 is the same as an acute angle formed between the outer peripheral surface of the distal side member 22 and the boundary surface 23. Thus, in the following drawings, either one of them may be illustrated and called the inclination angle θb of the boundary surface 23. In the present embodiment, the inclination angle θb of the boundary surface 23 is within a range of the following formula (1). In the formula (1), NA is defined by the numerical aperture of the optical fiber 80, n1 is defined by the refractive index of the proximal side member 21, and n2 is defined by the refractive index of the distal side member 22.

$$0<\theta b \leq \pi/2+[\arcsin(NA/n1)]-[\arcsin(n2/n1)] \qquad (1)$$

The light transmitting portion 11 transmits the light LT reflected or refracted by the optical path changing member 20 and allows the light LT to be emitted in a direction intersecting the central axis O of the light irradiation device 1 (hereinafter also simply referred to as a "lateral direction"). The light transmitting portion 11 is a light transmissive member formed in a substantially cylindrical shape having a substantially constant outer diameter from the proximal side to the distal side. As shown in FIG. 1 and FIG. 2, the light transmitting portion 11 is disposed so as to cover the outer peripheral surface of the optical path changing member 20 (specifically, the distal side member 22 and the proximal side member 21). In the illustrated example, the outer peripheral surface of the optical path changing member 20 and the inner peripheral surface of the light transmitting portion 11 are in contact with each other. However, there may be a gap between the optical path changing member 20 and the light transmitting portion 11. The outer diameter and the inner diameter of the light transmitting portion 11 can be freely determined.

The optical path changing member 20 can be formed by molding a transparent or translucent UV-curable resin into the above-mentioned shape and curing it with UV rays. In order to achieve the proximal side member 21 and the distal side member 22 having the different refractive indices n1 and n2, respectively, UV curable resins having the different refractive indices may be used as materials. Note that the optical path changing member 20 (the proximal side member 21 and the distal side member 22) may be achieved by an optical element such as a prism. The light transmitting portion 11 can be formed of a resin material having the light-transmitting property, for example, a polyolefin such as polyethylene, polypropylene, or an ethylene-propylene copolymer, a polyester such as polyethylene terephthalate, a thermoplastic resin such as polyvinyl chloride or polyurethane, or the like. Note that, when the light entered from the optical fiber 80 is visible light, the optical path changing member 20 (the proximal side member 21 and the distal side member 22) is preferably constituted as a transparent member from the viewpoint of improving the light transmitting property. The term "transparent member" described herein refers to a member that transmits light without absorbing or scattering the light. However, some absorption or scattering may occur due to a manufacturing error or processing error of the optical path changing member 20. On the other hand, when the light entered from the optical fiber 80 is infrared light, the optical path changing member 20 (the proximal side member 21 and the distal side member 22) may be constituted by using a material with the relatively large refractive indices n1 and n2, such as, for example, silicon or germanium.

Figure 3:
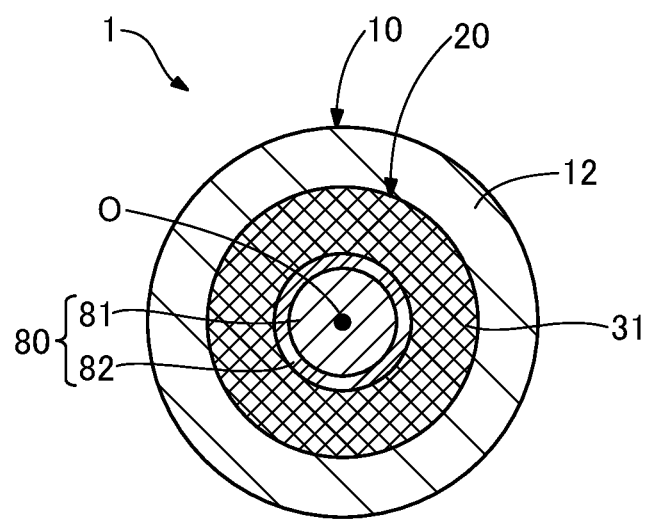
FIG. 3 is an explanatory diagram exemplifying a cross-sectional configuration along a line B-B in FIG. 1.

FIG. 3 is an explanatory diagram exemplifying a cross-sectional configuration along a line B-B in FIG. 1. As shown in FIG. 1, the extending portion 200 is a portion disposed on the proximal side of the light irradiation device 1 (the proximal side relative to the light irradiation portion 100) and includes the optical fiber 80, a main body portion 12, and a joint portion 31.

The optical fiber 80 transmits laser light (also simply referred to as "light") from a light source 3. The optical fiber 80 is a solid cable that extends along the axis O of the light irradiation device 1 and has a substantially constant outer diameter from the proximal side to the distal side. As shown in FIG. 3, the optical fiber 80 includes a core 81 extending along the axis O and a clad 82 covering the outer peripheral surface of the core 81. The core 81 is disposed substantially in the center of the clad 82 and has the higher optical refractive index than the clad 82. The clad 82 has the uniform refractive index. The optical fiber 80 transmits the light from the light source 3 by total reflection of the light using the refractive index difference between the core 81 and the clad 82. As shown in FIG. 1, at the distal end of the optical fiber 80, the optical fiber 80 is cut along a plane perpendicular to the axis O to expose the core 81. The distal portion of the optical fiber 80 is fixed with the exposed core 81 and the proximal side member 21 adjacent to each other. A proximal portion of the optical fiber 80 is connected to the light source 3 disposed outside via a connector, another optical fiber, or the like. The light source 3 is a laser light generator that generates laser light of any wavelength.

Note that the optical fiber 80 of the present embodiment is a plastic optical fiber in which both the core 81 and the clad 82 are made of a resin. The core 81 can be formed of, for example, polymethylmethacrylate (PMMA), polystyrene, polycarbonate, a deuterated polymer, a fluorine-based polymer, a silicon-based polymer, a norbornene-based polymer, or the like. The core 81 is classified into a single mode and a multimode according to the number of modes in which light propagates. Either of which may be used in the present embodiment. Further, in the case of multimode, it is classified into step index and graded index according to the refractive index distribution. Either of which may be used in the present embodiment. The clad 82 can be formed of, for example, a fluorine-based polymer. Note that, as the optical fiber 80, instead of the plastic optical fiber, a quartz glass optical fiber or a multi-component glass optical fiber may be employed. The length of the optical fiber 80 can be freely determined. Further, the optical fiber 80 may be formed only with the core 81 or further include one or more protective layers covering the clad 82.

The main body portion 12 covers the optical fiber 80. The main body portion 12 is a hollow member having an elongated outer shape and disposed along the axis O. The main body portion 12, which is formed in a substantially cylindrical shape, includes openings formed both at its distal and proximal ends and a lumen communicating both openings in its inside. The lumen of the main body portion 12 accommodates the entire optical fiber 80 except for the proximal side thereof. The main body portion 12 preferably has anti-thrombogenicity, flexibility, and biocompatibility and can be formed of a resin material or a metal material. As the resin material, for example, a polyamide resin, a polyolefin resin, a polyester resin, a polyurethane resin, a silicon resin, a fluorine resin, or the like can be adopted. As the metal material, for example, stainless-steel such as SUS304, a nickel-titanium alloy, a cobalt-chromium alloy, tungsten steel, or the like can be adopted. The outer diameter, the inner diameter, and the length of the main body portion 12 can be freely determined.

The joint portion 31 fixes the optical fiber 80 inside the main body portion 12. As shown in FIG. 3, the joint portion 31 is a layer of an adhesive filled between the inner peripheral surface of the main body portion 12 and the outer peripheral surface of the optical fiber 80. The joint portion 31 can be formed by any bonding agent, for example, metal solder such as silver solder, gold solder, zinc, an Sn—Ag alloy, or an Au—Sn alloy, or an adhesive such as an epoxy-based adhesive. Note that, in the example in FIG. 1, the joint portion 31 is disposed over the entire main body portion 12 in the X-axis direction. However, the joint portion 31 may be disposed only in a part of the main body portion 12 in the X-axis direction (e.g., a part of the main body portion 12 on the distal side, a part of the main body portion 12 on the proximal side, etc.). Further, the joint portion 31 may be omitted.

Figure 4:
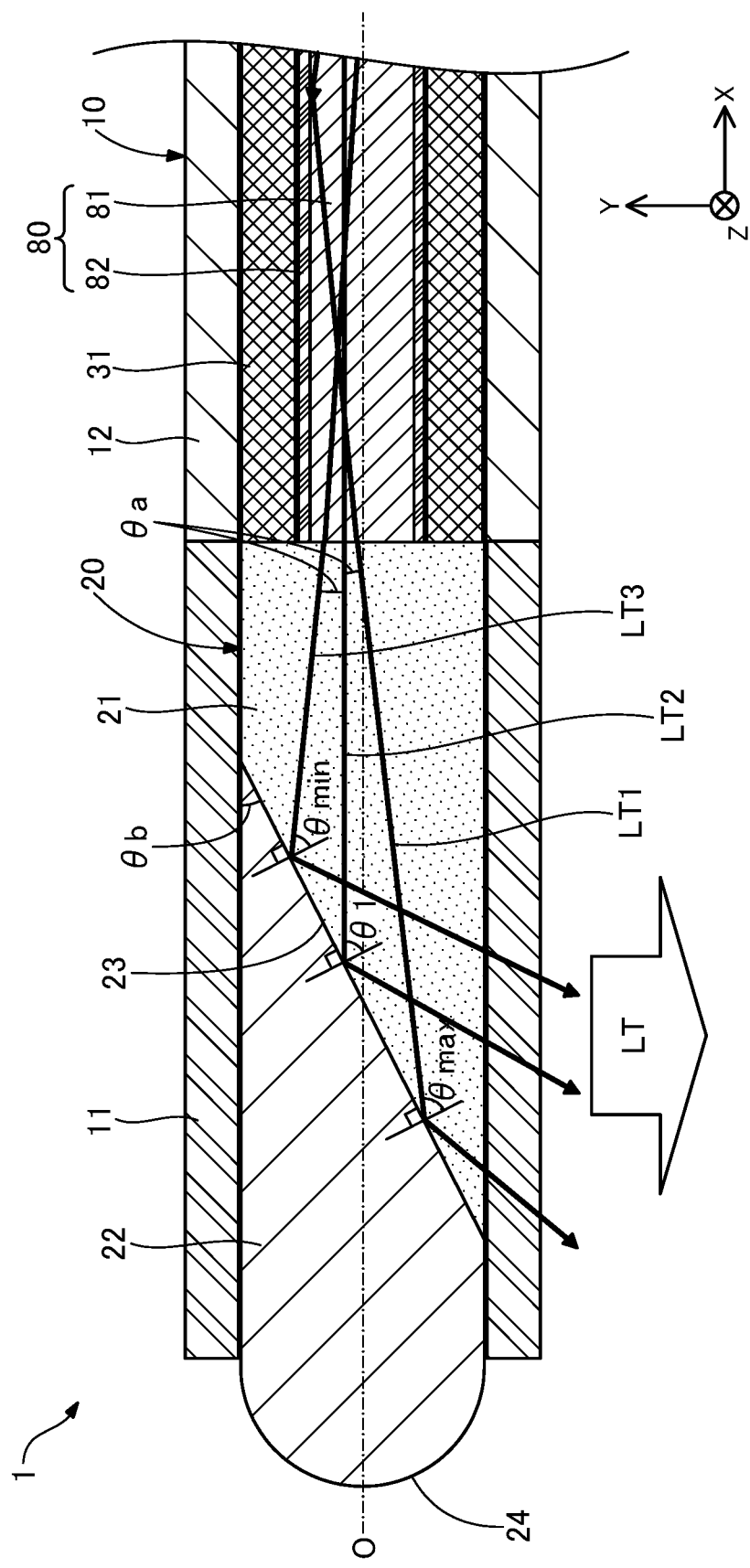
FIG. 4 is a diagram illustrating how the light irradiation device is used.

FIG. 4 is a diagram illustrating how the light irradiation device 1 is used. Note that, for convenience of illustration, FIG. 4 shows only a fraction of the light entering the optical path changing member 20 from the optical fiber 80. The light irradiation device 1 is used, for example, as follows. First, an operator inserts the light irradiation device 1 into the biological lumen such as the blood vessel. The operator pushes the light irradiation device 1 forward in the biological lumen and delivers the light irradiation portion 100 to a target site for light irradiation. In this operation, the operator may deliver the light irradiation device 1 using a catheter, an endoscope, or the like, not shown. After that, the operator turns on the light source 3. Laser light generated by the light source 3 is transmitted from the proximal side to the distal side of the optical fiber 80 via the core 81 of the optical fiber 80.

FIG. 4 shows a light LT2 that has entered the optical path changing member 20 in parallel with the axis O and lights LT1 and LT3 that have entered the optical path changing member 20 at the maximum divergence angles θa of the optical fiber 80 out of light transmitted via the optical fiber 80. Here, the incident angle of the incident light LT2 parallel to the axis O relative to the boundary surface 23 is represented by θ1. In the illustrated example, the boundary surface 23 of the optical path changing member 20 is inclined from the −Y-axis direction toward the +Y-axis direction when viewed along the X-axis direction. Thus, the incident light LT1 that has been entered at the maximum divergence angle θa in the −Y-axis direction enters the boundary surface 23 at the maximum incident angle θmax. On the other hand, the incident light LT3 that has been entered at the maximum divergence angle θa in the +Y-axis direction enters the boundary surface 23 at the minimum incident angle θmin. That is, the incident angles of the lights LT1 to LT3 are in a range of θmin<θ1<θmax. Note that the actual value of the maximum divergence angle θa is determined by the numerical aperture NA of the optical fiber 80 and the refractive index n1 of the proximal side member 21.

Here, the incident lights LT1 to LT3 entering the boundary surface 23 are totally reflected by the boundary surface 23 when the incident angles θmin, θ1, and θmax are larger than a critical angle θc. The critical angle θc is determined by the refractive index n1 of the proximal side member 21 and the refractive index n2 of the distal side member 22 according to Snell's law. Specifically, when the refractive index n1 of the proximal side member 21 is larger than the refractive index n2 of the distal side member 22 (n2<n1), the larger the difference between the refractive index n1 and the refractive index n2 (n1−n2), the smaller the critical angle θc and the easier it is for the incident lights LT1 to LT3 to be totally reflected by the boundary surface 23. That is, in order for all the incident lights LT1 to LT3 from the optical fiber 80 to be totally reflected by the boundary surface 23, it needs to satisfy "minimum incident angle θmin>critical angle θc".

On the other hand, in order for at least one of the incident lights LT1 to LT3 from the optical fiber 80 to be totally reflected by the boundary surface 23, it only needs to satisfy "maximum incident angle θmax>critical angle θc".

In the longitudinal section shown in FIG. 4, when the inclination angle θb of the boundary surface 23 (the acute angle formed between the central axis O of the optical fiber 80 and the boundary surface 23 of the optical path changing member 20) is within the range of the above-mentioned formula (1), at least one of the incident lights LT1 to LT3 from the optical fiber 80 can be totally reflected by the boundary surface 23 by satisfying "maximum incident angle θmax>critical angle θc".

For example, the closer the inclination angle θb of the boundary surface 23 is to the lower limit value (0°) of the formula (1), the larger the actual values of the minimum incident angle θmin, the incident angle θ1, and the maximum incident angle θmax. This can satisfy "minimum incident angle θmin>critical angle θc", and, as a result, all the incident lights LT1 to LT3 from the optical fiber 80 are totally reflected by the boundary surface 23 and emitted to the lateral side of the light irradiation device 1 as the light LT. (FIG. 4).

On the other hand, the closer the inclination angle θb of the boundary surface 23 is to the upper limit value (π/2+ [arcsin(NA/n1)]−[arcsin(n2/n1)]°) of the formula (1), the smaller the actual values of the minimum incident angle θmin, the incident angle θ1, and the maximum incident angle θmax. However, as long as the inclination angle θb is equal to or less than the upper limit value of the formula (1), it can satisfy "maximum incident angle θmax>critical angle θc". Thus, the incident light LT1 with the maximum incident angle θmax is totally reflected by the boundary surface 23 and emitted to the lateral side of the light irradiation device 1 as the light LT. Note that, in this case, the incident lights LT3 and LT2 with the minimum incident angle θmin and the incident angle θ1, respectively, are not totally reflected but refracted by the boundary surface 23.

As described above, according to the light irradiation device 1 of the present embodiment, by setting the inclination angle θb of the boundary surface 23 within the range of the formula (1), some or all of the lights LT1 to LT3 entering the boundary surface 23 from the optical fiber 80 can be totally reflected and emitted to the lateral side of the light irradiation device 1.

Next, the actual value of the inclination angle θb will be examined in a case where the laser light generated by the light source 3 is the whole light including visible light and a case where it is infrared light. The term "visible light" described herein means light with a wavelength λ in a range of 380 nm<wavelength λ<780 nm, and the term "infrared light" means light with the wavelength λ in a range of 780 nm<wavelength λ<1 mm.

Figure 6:
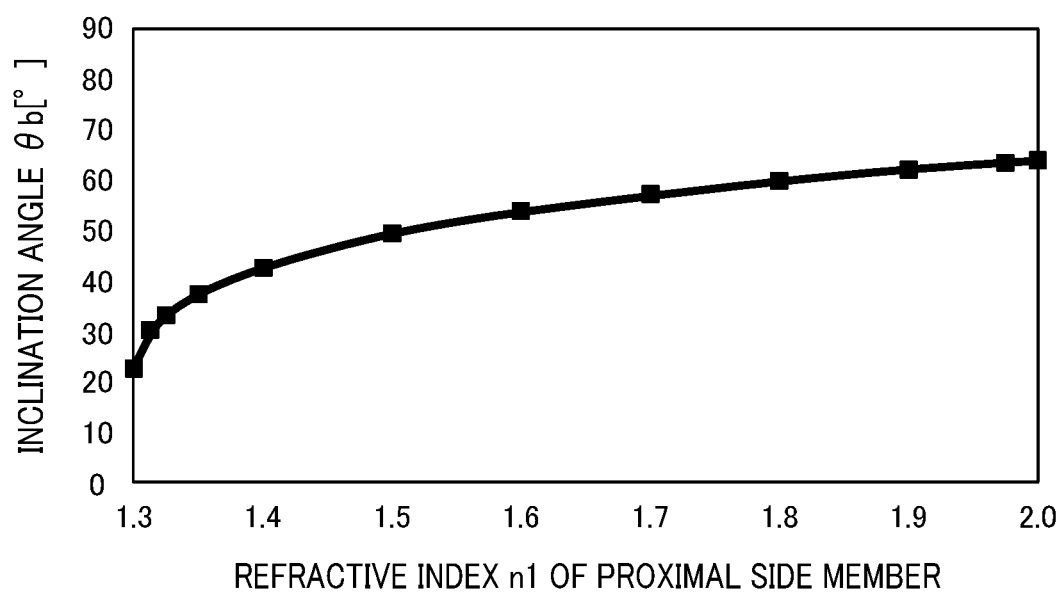
FIG. 6 is a diagram for describing the inclination angle θb of the boundary surface in the case where the whole light including the visible light is used.

FIG. 5 and FIG. 6 are diagrams for describing the inclination angle θb of the boundary surface in the case where the whole light including the visible light is used. The numerical aperture NA of the currently available optical fiber 80 is 0.1 or more and 0.5 or less regardless of modes (single mode and multimode). Further, the refractive index of the optical path changing member 20 (the proximal side member 21 and the distal side member 22) capable of transmitting the whole light including the visible light needs to be 1.3 or more and 2.0 or less. Based on these, the following conditions a1 and a2 are assumed as preconditions here.

$$0.1 \leq NA \leq 0.5 \qquad \text{(Condition a1)}$$

$$1.3 \leq n2 < n1 \leq 2.0 \qquad \text{(Condition a2)}$$

FIG. 5 shows the inclination angles θb of the boundary surface 23 obtained by the formula (1) while changing the refractive index n1 of the proximal side member 21, the refractive index n2 of the distal side member 22, and the numerical aperture NA of the optical fiber 80 within the ranges of the conditions a1 and a2. Note that FIG. 5 shows values rounded to second decimal places. In item number 1 to 6, the numerical aperture NA of the optical fiber 80 was set to the upper limit value of 0.5, and, in item number 7 to 12, the numerical aperture NA of the optical fiber 80 was set to the lower limit value of 0.1. In item number 1 to 3 and item number 7 to 9, the refractive index n1 of the proximal side member 21 was fixed at the upper limit value of 2, and the refractive index n2 of the distal side member 22 was changed within the range of the condition a2. In item number 4 to 6 and item number 10 to 12, the refractive index n2 of the distal side member 22 was fixed at the lower limit value of 1.3, and the refractive index n1 of the proximal side member 21 was changed within the range of the condition a2.

As shown in item number 1 and 6 (bold frame) in FIG. 5, it was found that the upper limit value of the inclination angle θb of the boundary surface 23 was obtained when the numerical aperture NA had the upper limit value of 0.5 and the difference between the refractive index n1 of the proximal side member 21 and the refractive index n2 of the distal side member 22 (n1−n2) was the largest. Further, it was found that the upper limit value of the inclination angle θb of the boundary surface 23 was 63.93°. On the other hand, as shown in item number 9 (bold frame) in FIG. 5, it was found that the lower limit value of the inclination angle θb of the boundary surface 23 was obtained when the numerical aperture NA had the lower limit value of 0.1 and the difference between the refractive index n1 of the proximal side member 21 and the refractive index n2 of the distal side member 22 (n1−n2) was the smallest. Further, it was found that the lower limit value of the inclination angle θb of the boundary surface 23 was 8.59°.

FIG. 6 is a graph showing changes in the values of the inclination angle θb of the boundary surface 23 when the refractive index n1 of the proximal side member 21 is changed more finely in item number 4 to 6 (NA=0.5 and n2=1.3). In the examples in FIG. 5 and FIG. 6, the numerical aperture NA and the refractive indices n1 and n2 are each obtained as values rounded to second decimal places, thus the obtained inclination angle θb is not a precise value. In consideration of this point, from the results in FIG. 5 and FIG. 6, the inclination angle θb of the boundary surface 23 is preferably in a range of 0°<θb<64° in order for at least a fraction of the whole light including the visible light to be totally reflected by the boundary surface 23.

Figure 8:
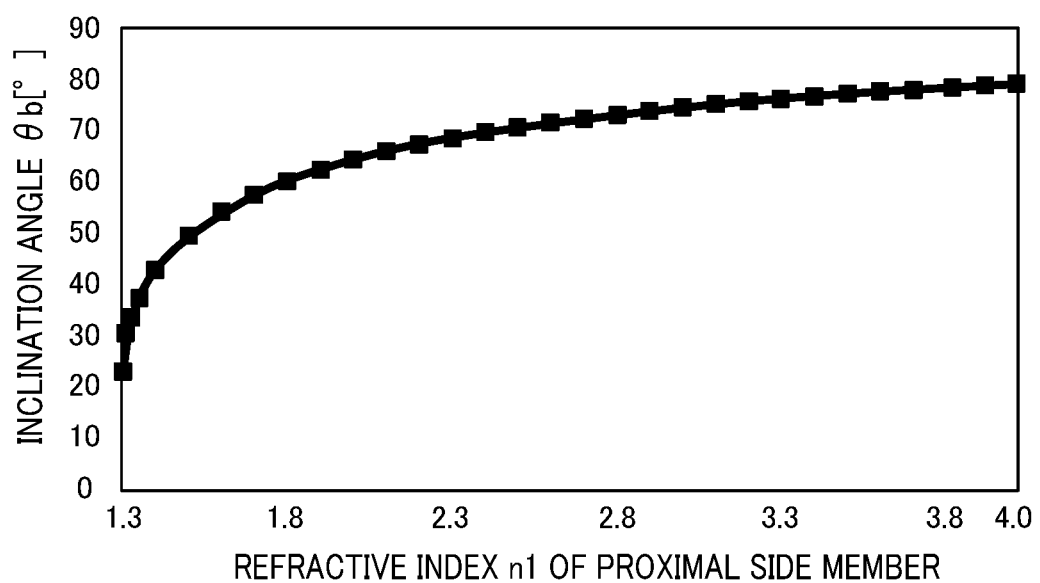
FIG. 8 is a diagram for describing the inclination angle θb of the boundary surface in the case where the infrared light is use.

FIG. 7 and FIG. 8 are diagrams for describing the inclination angle θb of the boundary surface when the infrared light is used. As described above, the numerical aperture NA of the currently available optical fiber 80 is 0.1 or more and 0.5 or less regardless of modes. Further, the refractive index of the optical path changing member 20 (the proximal side member 21 and the distal side member 22) capable of transmitting the infrared light needs to be 1.3 or more and 4.0 or less. In consideration of these, the following conditions b1 and b2 are assumed as preconditions here.

$$0.1 \leq NA \leq 0.5 \quad \text{(Condition b1)}$$

$$1.3 \leq n2 < n1 \leq 4.0 \quad \text{(Condition b2)}$$

FIG. 7 shows the inclination angles θb of the boundary surface 23 obtained by the formula (1) while changing the refractive index n1 of the proximal side member 21, the refractive index n2 of the distal side member 22, and the numerical aperture NA of the optical fiber 80 within the ranges of the conditions b1 and b2. Note that FIG. 7 shows values rounded to second decimal places. In item number 21 to 26, the numerical aperture NA of the optical fiber 80 was set to the upper limit value of 0.5, and, in item number 27 to 32, the numerical aperture NA of the optical fiber 80 was set to the lower limit value of 0.1. In item number 21 to 23 and item number 27 to 29, the refractive index n1 of the proximal side member 21 was fixed at the upper limit value of 4, and the refractive index n2 of the distal side member 22 was changed within the range of the condition b2. In item number 24 to 26 and item number 30 to 32, the refractive index n2 of the distal side member 22 was fixed at the lower limit value of 1.3, and the refractive index n1 of the proximal side member 21 was changed within the range of the condition b2.

As shown in item number 21 and 26 (bold frame) in FIG. 7, it was found that the upper limit value of the inclination angle θb of the boundary surface 23 was obtained when the numerical aperture NA had the upper limit value of 0.5 and the difference between the refractive index n1 of the proximal side member 21 and the refractive index n2 of the distal side member 22 (n1−n2) was the largest. Further, it was found that the upper limit value of the inclination angle θb of the boundary surface 23 was 78.21°. On the other hand, as shown in item number 29 (bold frame) in FIG. 7, it was found that the lower limit value of the inclination angle θb of the boundary surface 23 was obtained when the numerical aperture NA had the lower limit value of 0.1 and the difference between the refractive index n1 of the proximal side member 21 and the refractive index n2 of the distal side member 22 (n1−n2) was the smallest. Further, it was found that the lower limit value of the inclination angle θb of the boundary surface 23 was 5.48°.

FIG. 8 is a graph showing changes in the values of the inclination angle θb of the boundary surface 23 when the refractive index n1 of the proximal side member 21 is changed more finely in item number 24 to 26 (NA=0.5 and n2=1.3). In the examples in FIG. 7 and FIG. 8, the numerical aperture NA and the refractive indices n1 and n2 are each obtained as values rounded to second decimal places, thus the obtained inclination angle θb is not a precise value. In consideration of this point, from the results in FIG. 7 and FIG. 8, the inclination angle θb of the boundary surface 23 is preferably in a range of 0°<θb<79° in order for at least a fraction of the infrared light in the range of 780 nm<wavelength λ<1 mm to be reflected by the boundary surface 23.

Figure 9A:
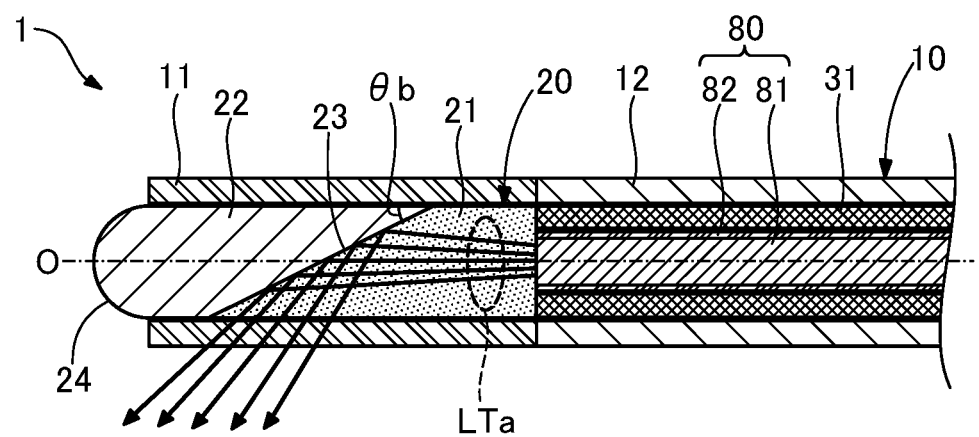
FIGS. 9A and 9B are diagrams for describing reflected light and refracted light according to the inclination angle θb of the boundary surface.
Figure 9B:
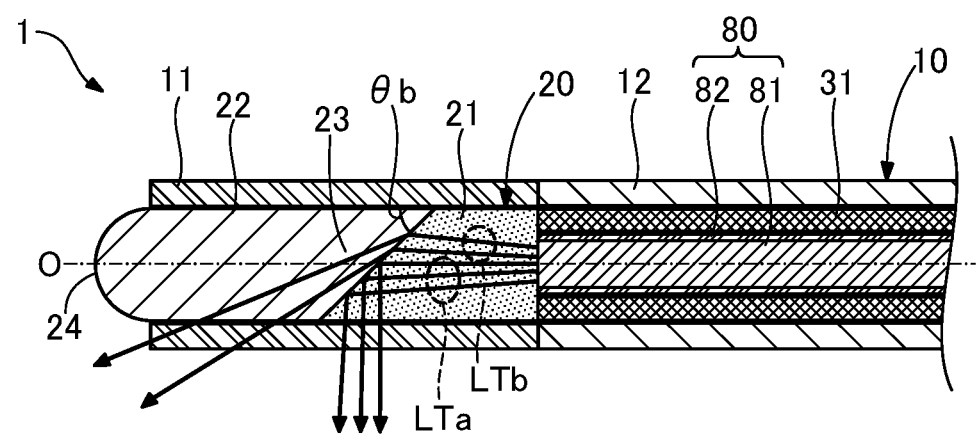

FIGS. 9A and 9B are diagrams for describing reflected light and refracted light according to the inclination angle θb of the boundary surface. FIG. 9A shows how all of the incident lights are totally reflected by the boundary surface 23 and FIG. 9B shows how some of the incident lights are totally reflected by the boundary surface 23. As shown in FIG. 9A, the smaller the inclination angle θb of the boundary surface 23, the more likely it is for all the incident light LTa entering the optical path changing member 20 to be totally reflected by the boundary surface 23. On the other hand, as shown in FIG. 9B, when the inclination angle θb of the boundary surface 23 increases, the incident light LTb with the angle near the minimum incident angle θmin is not totally reflected but refracted by the boundary surface 23. The proportion of the incident light LTb that is not totally reflected by the boundary surface 23 increases as the inclination angle θb of the boundary surface 23 increases. The upper limit value of the inclination angle θb of the boundary surface 23 causing the total reflection in this manner is 64° for the whole light including the visible light and 79° for the infrared light as described in FIG. 5 to FIG. 8.

As described above, according to the light irradiation device 1 of the first embodiment, the optical path changing member 20 includes the boundary surface 23 where the proximal side member 21 and the distal side member 22 are in contact with each other and which is inclined relative to the vertical plane of the central axis O of the optical fiber 80 (YZ plane along the line A-A in FIG. 1). The optical path changing member 20 changes the optical path of the light entered from the optical fiber 80 by using the boundary surface 23. In this manner, the light from the optical fiber 80 can be emitted in the direction intersecting the central axis O of the light irradiation device 1 without bending the optical fiber 80, in other words, while reducing the light loss that occurs when the optical fiber 80 is bent. Further, the boundary surface 23 that changes the optical path of the light entered from the optical fiber 80 is a surface where the proximal side member 21 and the distal side member 22 are in contact with each other. Thus, even when the light irradiation device 1 is inserted into the blood vessel, for example, there is no risk of air embolism in the blood vessel. Further, since both the proximal side member 21 and the distal side member 22 are constituted by the member having the light transmitting property, there is no risk that the proximal side member 21 and the distal side member 22 absorb the light and generate heat. Further, even if the blood enters inside the light irradiation device 1, the air is not replaced with the blood, so that it becomes possible to reduce the risk of heating the blood and causing blood coagulation due to light absorption. Thus, the device is excellent in safety. Further, in the optical path changing member 20 having the distal side member 22 on the distal side of the boundary surface 23, the distal portion 24 of the distal side member 22 is formed in the shape with high safety (e.g., a curved shape having a certain radius R as shown in FIG. 4), which can further improve the safety of the light irradiation device 1 inserted into the biological lumen. Further, in the optical path changing member 20 having the distal side member 22 on the distal side of the boundary surface 23, it is possible to improve the strength of the distal side of the optical path changing member 20 and prevent a damage to the optical path changing member 20.

Further, according to the light irradiation device 1 of the first embodiment, the boundary surface 23 that changes the optical path of the light entered from the optical fiber 80 is the flat surface inclined relative to the vertical plane of the central axis O of the optical fiber 80 (YZ plane along the line A-A in FIG. 1). Thus, the light entered from the optical fiber 80 can be easily totally reflected by the boundary surface 23 by adjusting the inclination angle θb of the boundary surface 23. Further, at least a part of the boundary surface 23, irradiated with the light from the optical fiber 80, is formed in the flat surface, so that there is little effect of axial misalignment of the optical fiber 80 in the light irradiation device 1, and the proximal side member 21 and the distal side member 22 can be easily produced.

Further, according to the light irradiation device 1 of the first embodiment, the distal portion 24 of the distal side member 22 disposed on the distal side of the boundary surface 23 is formed in the curved shape having a certain radius R. Thus, the safety of the light irradiation device 1 can be improved as compared with a case where the optical element is formed in a shape sharpened from the proximal side toward the distal side, for example.

Second Embodiment

Figure 10:
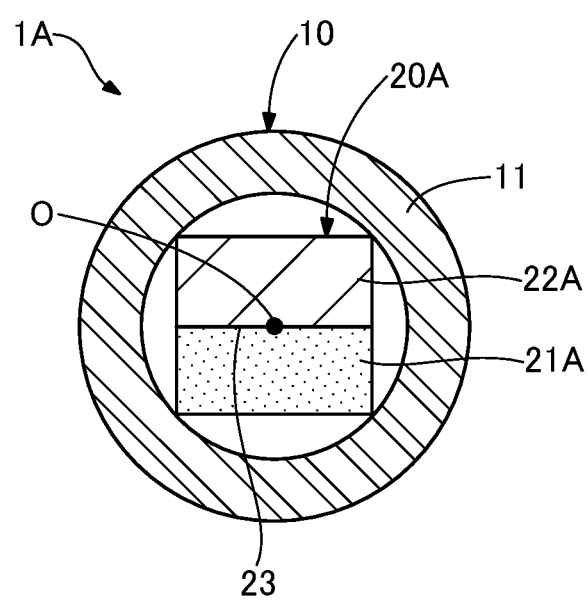
FIG. 10 is an explanatory diagram exemplifying a cross-sectional configuration of a light irradiation device of a second embodiment along the line A-A (FIG. 1).

FIG. 10 is an explanatory diagram exemplifying a cross-sectional configuration of a light irradiation device 1A of a second embodiment along the line A-A (FIG. 1). The light irradiation device 1A of the second embodiment includes an optical path changing member 20A instead of the optical path changing member 20 in the configuration of the first embodiment. The optical path changing member 20A is, as shown in the drawing, a substantially square prism-shaped solid member having a substantially constant outer diameter from the proximal side to the distal side. The optical path changing member 20A includes a distal side member 22A and a proximal side member 21A. The configurations of the distal side member 22A and the proximal side member 21A are the same as those of the first embodiment except for the shape.

As described above, the configuration of the optical path changing member 20A can be modified in various ways, and the optical path changing member 20A may be formed in a shape other than the substantially cylindrical shape. The shape of the optical path changing member 20A may be the substantially square prism shape shown in FIG. 10 or a substantially polygonal prism shape. Further, one of the proximal side member 21A and the distal side member 22A may be formed in the shape described in the first embodiment, and the other may be formed in the shape described in the second embodiment. With the light irradiation device 1A of the second embodiment as described above, the same effects as those of the above-mentioned first embodiment can be achieved. Further, according to the light irradiation device 1A of the second embodiment, the emission surface of the reflected light LT reflected by the boundary surface 23 can be made flat as shown in FIG. 10, so that the emitted light can be dispersed.

Third Embodiment

Figure 11:
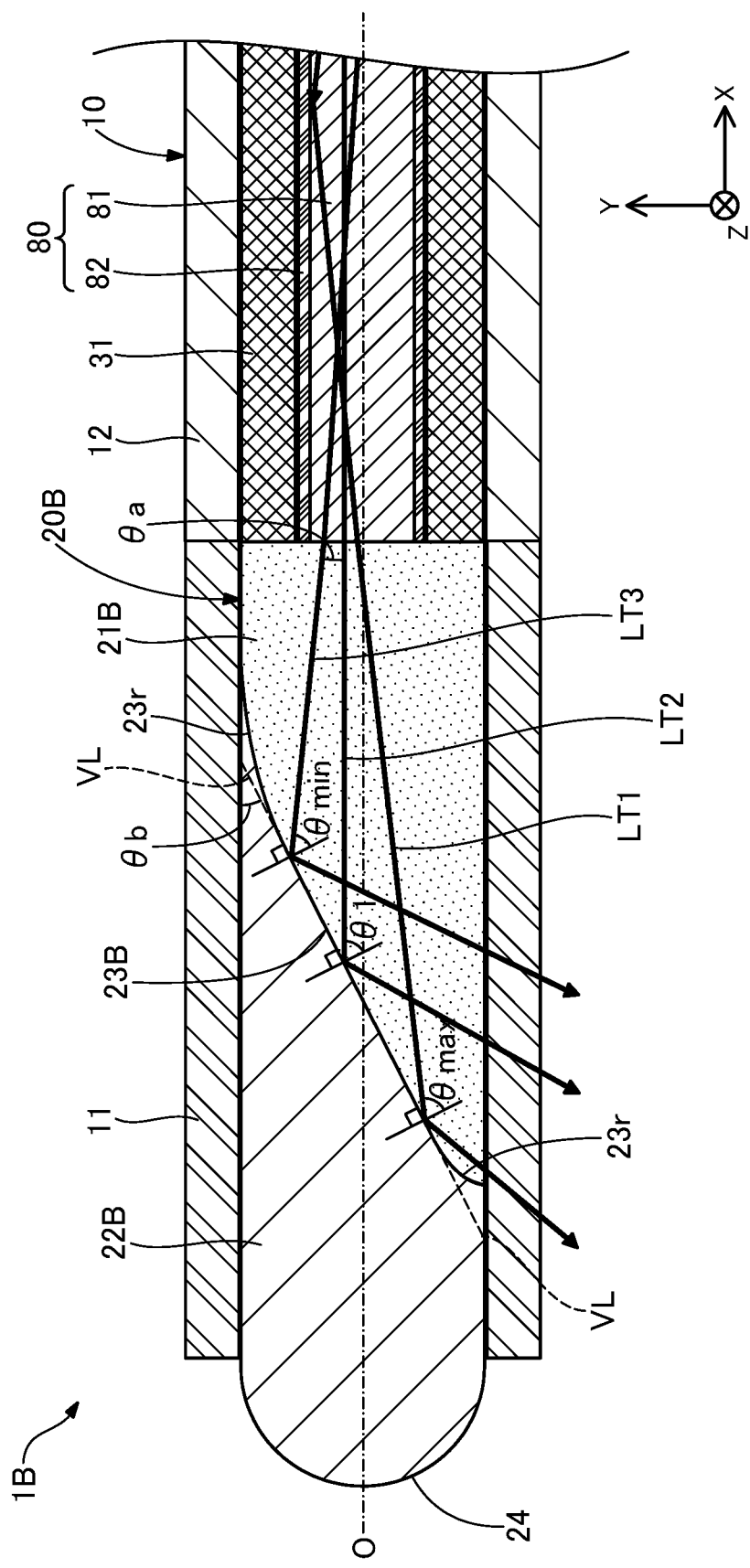
FIG. 11 is an explanatory diagram exemplifying a configuration of a light irradiation device of a third embodiment.

FIG. 11 is an explanatory diagram exemplifying a configuration of a light irradiation device 1B of a third embodiment. The light irradiation device 1B of the third embodiment includes an optical path changing member 20B instead of the optical path changing member 20 in the configuration of the first embodiment. The optical path changing member 20B forms a boundary surface 23B by the contact between a distal side member 22B disposed on the distal side and a proximal side member 21B disposed on the proximal side.

The boundary surface 23B has a flat surface in the central part and a curved surface in an outer peripheral part in the YZ-axis direction. The term "central part" described herein means a part irradiated with the incident light LT1 (light with the maximum incident angle θmax), LT2 (light parallel to the axis O), and LT3 (light with the minimum incident angle θmin) from the optical fiber 80. The "outer peripheral part" means a part not irradiated with the incident lights LT1 to LT3 from the optical fiber 80. That is, in the boundary surface 23B of the third embodiment, only the flat surface that is inclined relative to the vertical plane of the central axis O of the optical fiber 80 is irradiated with the light from the optical fiber 80. Note that FIG. 11 shows a virtual line VL extended from the flat part of the boundary surface 23B to represent the inclination angle θb of the boundary surface 23B.

As described above, the configuration of the optical path changing member 20B can be modified in various ways, and the optical path changing member 20B may be formed such that at least a part (central part) of the boundary surface 23B, irradiated with the lights LT1 to LT3 from the optical fiber 80, is made as a flat surface and other parts not irradiated with the lights LT1 to LT3 are made as a curved surface. With the light irradiation device 1B of the third embodiment as described above, the same effects as those of the above-mentioned first embodiment can be achieved. Further, according to the light irradiation device 1B of the third embodiment, it is possible to increase the contact area between the proximal side member 21B and the distal side member 22B, making it possible to provide the optical path changing member 20B that is even less likely to be damaged.

Fourth Embodiment

Figure 12:
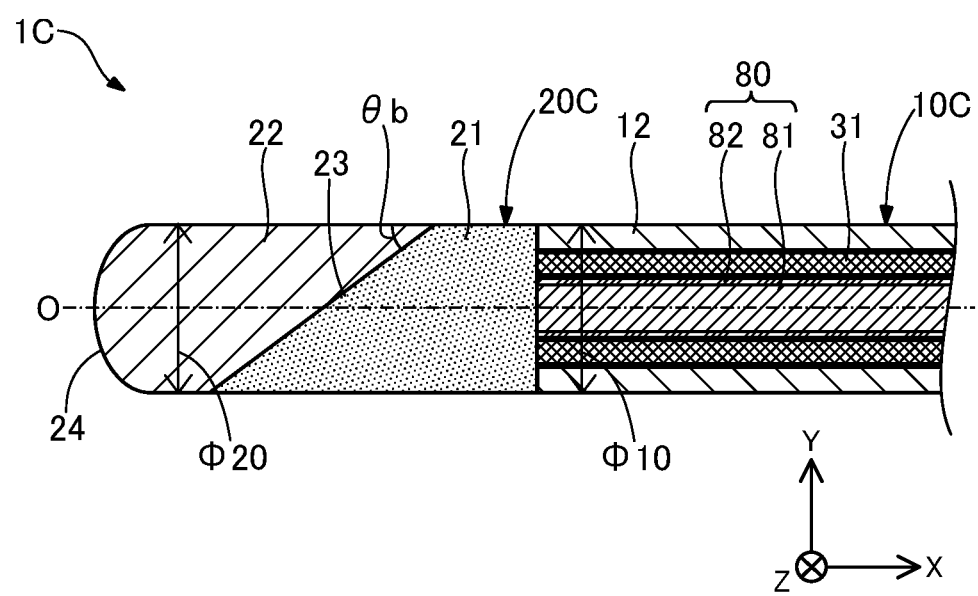
FIG. 12 is an explanatory diagram exemplifying a configuration of a light irradiation device of a fourth embodiment.

FIG. 12 is an explanatory diagram exemplifying a configuration of a light irradiation device 1C of a fourth embodiment. The light irradiation device 1C of the fourth embodiment includes a shaft 10C instead of a shaft 10 and an optical path changing member 20C instead of the optical path changing member 20 in the configuration of the first embodiment. The shaft 10C does not include the light transmitting portion 11 (FIG. 1) that covers the optical path changing member 20, and the optical path changing member 20C is exposed to the outside. In the illustrated example, an outer diameter Φ10 of the shaft 10C (main body portion 12) is equal to an outer diameter Φ20 of the optical path changing member 20C. Note that the term "equal" means that a difference due to a manufacturing error is allowed. The outer diameter Φ10 and the outer diameter Φ20 may be different from each other.

As described above, the configurations of the shaft 10C and the optical path changing member 20C can be modified in various ways. The shaft 10C may not cover the optical path changing member 20C and the optical path changing member 20C may be exposed to the outside. With the light irradiation device 1C of the fourth embodiment as described above, the same effects as those of the above-mentioned first embodiment can be achieved. Further, according to the light irradiation device 1C of the fourth embodiment, since the light is not transmitted through the light transmitting portion 11, it becomes possible to prevent the light loss due to the light being transmitted through the light transmitting portion 11, making it possible to increase the light output of the light emitted from the light irradiation device 1C to the biological tissue.

Fifth Embodiment

Figure 13:
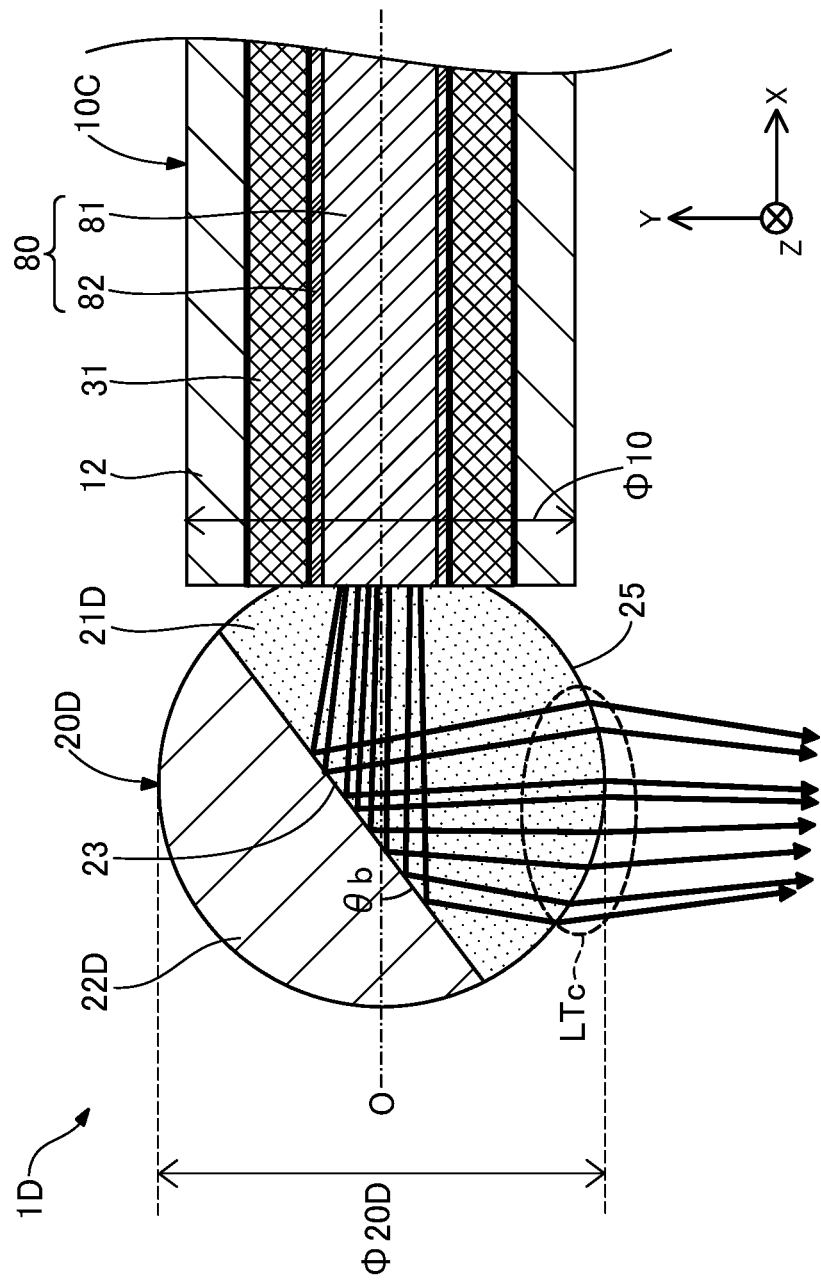
FIG. 13 is an explanatory diagram exemplifying a configuration of a light irradiation device of a fifth embodiment.

FIG. 13 is an explanatory diagram exemplifying a configuration of a light irradiation device 1D of a fifth embodiment. The light irradiation device 1D of the fifth embodiment includes an optical path changing member 20D instead of the optical path changing member 20C in the configuration of the fourth embodiment. As shown in FIG. 13, the optical path changing member 20D is formed in a substantially spherical shape configured by a hemispherical distal side member 22D and a hemispherical proximal side member 21D. In this configuration, a region 25 of the outer peripheral surface of the proximal side member 21D, through which the reflected light LTc reflected by the boundary surface 23 passes, is formed in a spherical shape. As shown in FIG. 13, the reflected light LTc reflected by the boundary surface 23 is refracted in the spherical region 25 and condensed. Note that, in the illustrated example, the outer diameter Φ10 of the shaft 10C (main body portion 12) is smaller than an outer diameter Φ20D of the optical path changing member 20. However, the outer diameter Φ10 and the outer diameter Φ20D may be the same, or the outer diameter Φ10 may be larger than the outer diameter Φ20D.

As described above, the configuration of the optical path changing member 20D can be modified in various ways, and the optical path changing member 20D may be formed in the substantially spherical shape. With the light irradiation device 1D of the fifth embodiment as described above, the same effects as those of the above-mentioned first embodiment and fourth embodiment can be achieved. Further, according to the light irradiation device 1D of the fifth embodiment, the region 25 of the outer peripheral surface of the proximal side member 21D, through which the reflected light LTc reflected by the boundary surface 23 passes, is formed in the spherical shape, thus the reflected light LTc that has passed through the spherical surface can be condensed. As a result, it becomes possible to increase the light output of the light emitted from the light irradiation device 1D to the biological tissue. Further, the optical path changing member 20D formed in the substantially spherical shape can further reduce a risk of damaging the biological tissue, making it possible to further improve the safety. Note that, in the example in FIG. 13, the reflected light LTc is condensed by using the spherical region 25. However, the reflected light LTc may be collimated (an optical adjustment to obtain parallel light) by using the spherical region 25. As described above, according to the light irradiation device 1D of the fifth embodiment, it becomes possible to control the irradiation range of the light emitted to the biological tissue.

Sixth Embodiment

Figure 14:
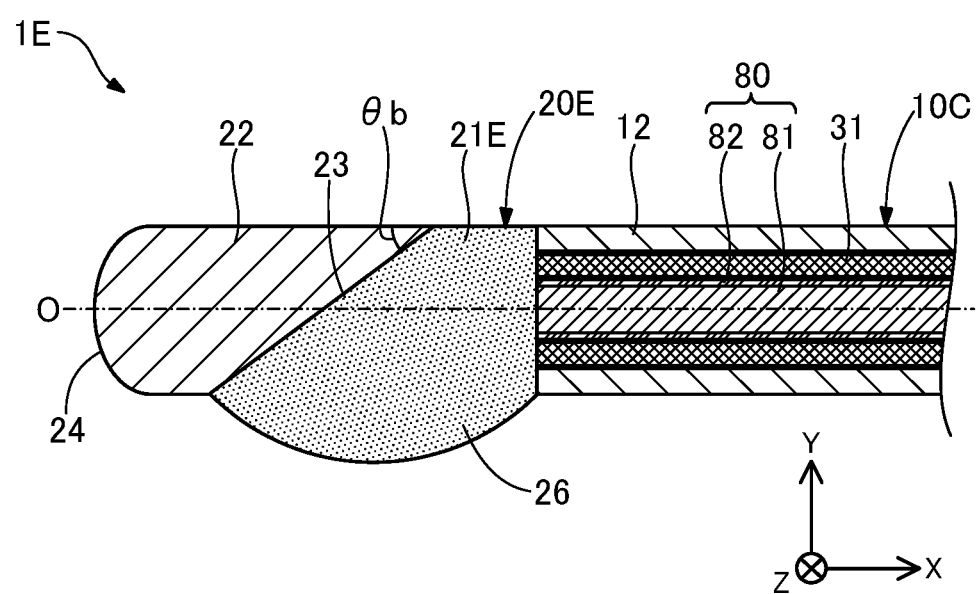
FIG. 14 is an explanatory diagram exemplifying a configuration of a light irradiation device of a sixth embodiment.

FIG. 14 is an explanatory diagram exemplifying a configuration of a light irradiation device 1E of a sixth embodiment. The light irradiation device 1E of the sixth embodiment includes an optical path changing member 20E instead of the optical path changing member 20C in the configuration of the fourth embodiment. As shown in FIG. 14, the optical path changing member 20E includes a proximal side member 21E instead of the proximal side member 21. The outer peripheral surface of the proximal side member 21E on the side through which the reflected light by the boundary surface 23 passes (FIG. 14: −Y-axis direction) is formed as a protruding portion 26 that protrudes in a spherical shape. The reflected light reflected by the boundary surface 23 is refracted and condensed on the surface of the protruding portion 26 as in FIG. 13.

As described above, the configuration of the optical path changing member 20E can be modified in various ways, and the proximal side member 21E of the optical path changing member 20E may include the protruding portion 26 that protrudes in the spherical shape. In the illustrated example, the protruding portion 26 is disposed only in a part of the outer peripheral surface of the proximal side member 21E (FIG. 14: −Y-axis direction). However, the protruding portion 26 may be disposed on the entire outer peripheral surface of the proximal side member 21E. With the light irradiation device 1E of the sixth embodiment as described above, the same effects as those of the above-mentioned first, fourth, and fifth embodiments can be achieved.

Seventh Embodiment

Figure 15:
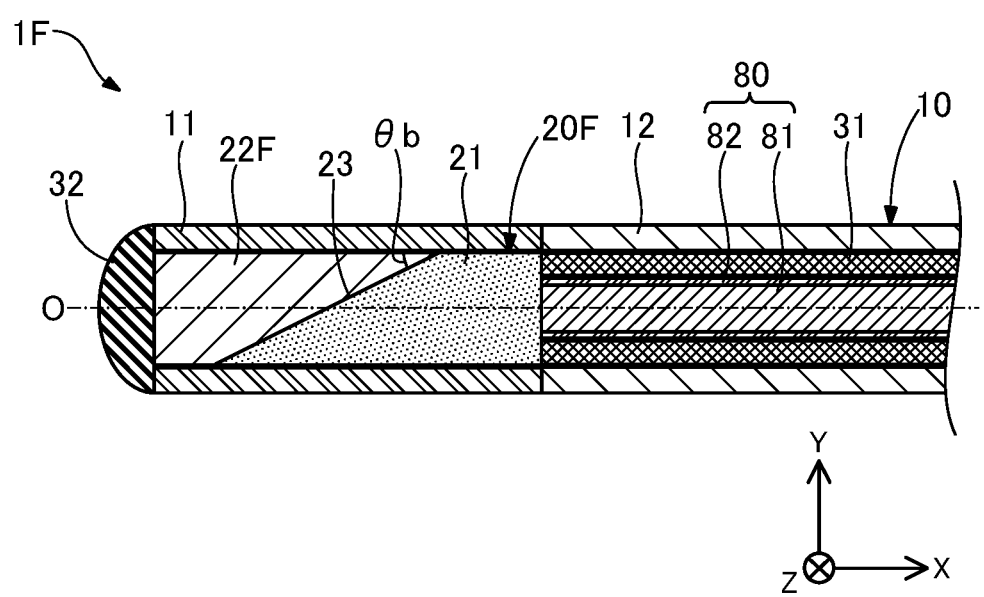
FIG. 15 is an explanatory diagram exemplifying a configuration of a light irradiation device of a seventh embodiment.

FIG. 15 is an explanatory diagram exemplifying a configuration of a light irradiation device 1F of a seventh embodiment. The light irradiation device 1F of the seventh embodiment includes an optical path changing member 20F instead of the optical path changing member 20 in the configuration of the first embodiment and further includes a distal tip 32. The optical path changing member 20F includes a distal side member 22F instead of the distal side member 22. A distal portion of the distal side member 22F is not formed in a curved shape, and the distal portion of the distal side member 22F is formed in a flat surface parallel to the vertical plane of the central axis O of the optical fiber 80. The distal tip 32 joins the distal portion of the distal side member 22F and a distal portion of the shaft 10 (light transmitting portion 11) and holds them integrally. The distal tip 32 preferably has flexibility and can be formed of, for example, a resin material such as polyurethane or a polyurethane elastomer. Note that the distal tip 32 may be formed of a radiopaque material.

As described above, the configuration of the light irradiation device 1F can be modified in various ways, and the light irradiation device 1F may include the distal tip 32 which joins the shaft 10 and the optical path changing member 20F and advances in the biological lumen ahead of the shaft 10 and the optical path changing member 20F. As shown in FIG. 15, the distal tip 32 may be composed only of a resin member or may be composed of a combination of a coil body obtained by spirally winding a wire and a resin member. With the light irradiation device 1F of the seventh embodiment as described above, the same effects as those of the above-mentioned first embodiment can be achieved. Further, according to the light irradiation device 1F of the seventh embodiment, the safety of the light irradiation device 1F can be further improved.

Eighth Embodiment

Figure 16:
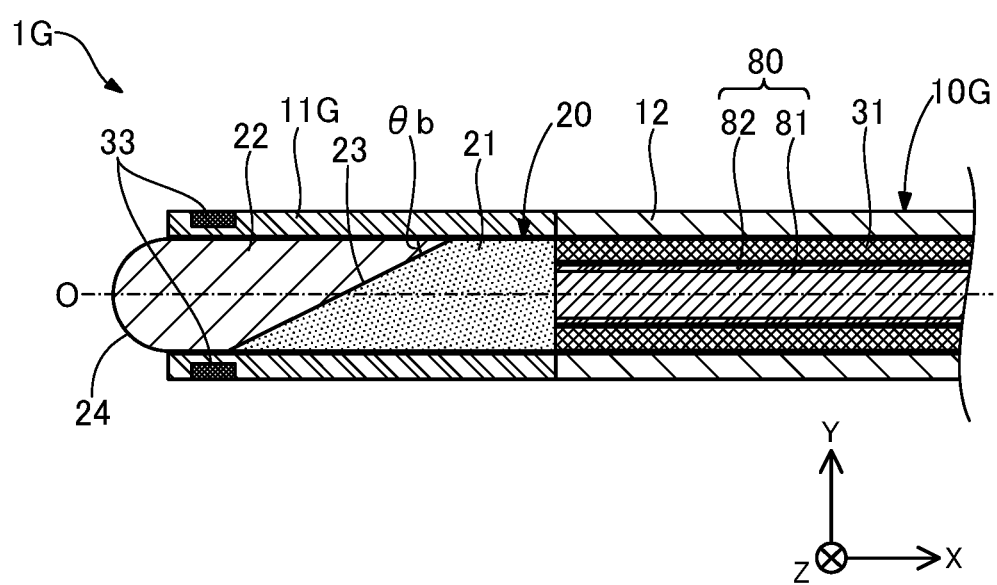
FIG. 16 is an explanatory diagram exemplifying a configuration of a light irradiation device of an eighth embodiment.

FIG. 16 is an explanatory diagram exemplifying a configuration of a light irradiation device 1G of an eighth embodiment. The light irradiation device 1G of the eighth embodiment includes a shaft 10G instead of the shaft 10 in the configuration of the first embodiment and further includes a marker 33. The shaft 10G includes a light transmitting portion 11G instead of the light transmitting portion 11. The radiopaque marker 33 is embedded in a thick part of the light transmitting portion 11G so as to surround in the circumferential direction (YZ-axis direction). The marker 33 is used to identify a distal portion of the light irradiation device 1G with an X-ray image. Thus, the marker 33 is preferably disposed in a part of the light transmitting portion 11G on the distal side.

The marker 33 can be formed of a radiopaque resin material or metal material. For example, in a case of using a resin material, the marker 33 can be formed by mixing a radiopaque material such as bismuth trioxide, tungsten, or barium sulfate with a polyamide resin, a polyolefin resin, a polyester resin, a polyurethane resin, a silicon resin, or a fluorine resin. For example, in a case of using a metal material, the marker 33 can be formed of a radiopaque material such as gold, platinum, tungsten, or an alloy containing these elements (e.g., a platinum-nickel alloy).

As described above, the configuration of the light irradiation device 1G can be modified in various ways, and the light irradiation device 1G may include the marker 33. The shape of the marker 33 can be modified in various ways, and a spiral shape, a slit shape, a mesh shape, or the like can be adopted in addition to the annular shape shown in FIG. 16. Further, second and third markers may be disposed at a location different from the distal portion of the light transmitting portion 11G (e.g., the proximal portion of the light transmitting portion 11G, the distal portion of the main body portion 12, the substantially central part of the main body portion 12, etc.). With the light irradiation device 1G of the eighth embodiment as described above, the same effects as those of the above-mentioned first embodiment can be achieved. Further, according to the light irradiation device 1G of the eighth embodiment, the distal portion of the light irradiation device 1G can be identified with the X-ray image, so that the usability of the light irradiation device 1G can be improved.

Ninth Embodiment

Figure 17:
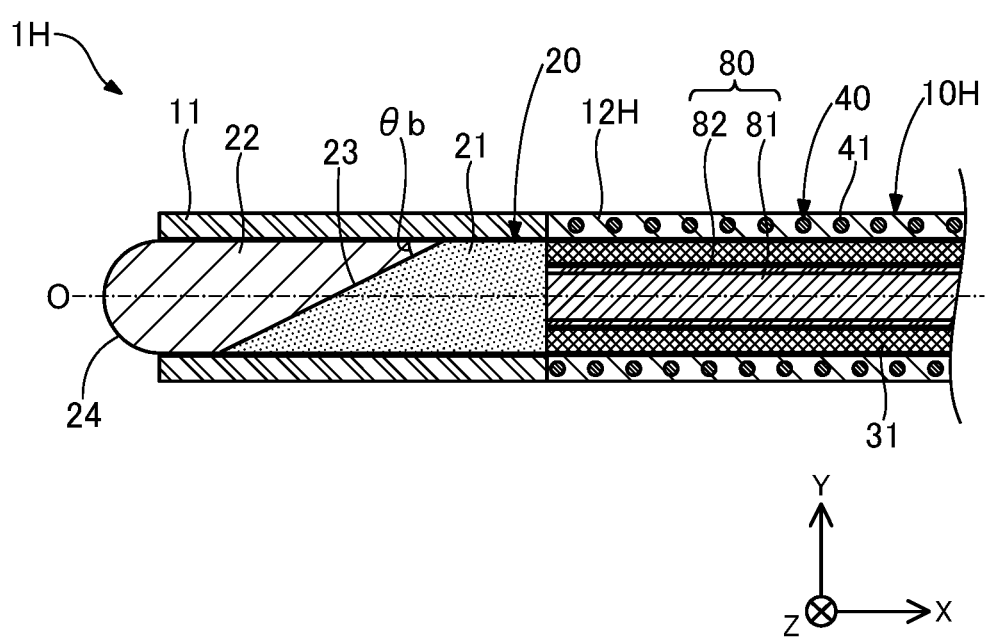
FIG. 17 is an explanatory diagram exemplifying a configuration of a light irradiation device of a ninth embodiment.

FIG. 17 is an explanatory diagram exemplifying a configuration of a light irradiation device 1H of a ninth embodiment. The light irradiation device 1H of the ninth embodiment includes a shaft 10H instead of the shaft 10 in the configuration of the first embodiment and further includes a coil body 40. The shaft 10H includes a main body portion 12H instead of the main body portion 12. The coil body 40 is embedded in a thick part of the main body portion 12H.

The coil body 40 is formed by spirally winding an elongated wire 41 in the circumferential direction (YZ-axis direction). In the example in FIG. 17, the coil body 40 is a single-strand coil formed by winding the single wire 41 into a single strand. However, the coil body 40 may be a multi-strand coil formed by winding a plurality of the wires 41 in multiple strands, a single strand twisted coil formed by winding a twisted wire consisting of multiple wires into a single strand, or a multi-strand twisted coil formed by winding multiple twisted wires each consisting of multiple wires in multiple strands. The wire 41 can be formed of, for example, a stainless steel alloy such as SUS304 or SUS316, a super-elastic alloy such as a nickel-titanium alloy, a piano wire, a radiolucent alloy such as a nickel-chromium alloy or a cobalt alloy, or a radiopaque alloy such as, gold, platinum, tungsten, or an alloy containing these elements (e.g., a platinum-nickel alloy). The wire diameter of the wire 41 and the outer diameter and the inner diameter of the coil body 40 can be freely determined.

As described above, the configuration of the light irradiation device 1H can be modified in various ways, and the light irradiation device 1H may include the coil body 40 to reinforce the shaft 10H. In the illustrated example, the coil body 40 is embedded in the thick part of the main body portion 12H. However, the coil body 40 may be embedded in a thick part of the light transmitting portion 11 or may be embedded in both the light transmitting portion 11 and the main body portion 12H. Further, instead of the coil body 40, a mesh body formed by weaving the wires 41 may be provided. With the light irradiation device 1H of the ninth embodiment as described above, the same effects as those of the above-mentioned first embodiment can be achieved. Further, according to the light irradiation device 1H of the ninth embodiment, by providing the coil body 40, the torque transmissibility and durability of the light irradiation device 1H can be improved.

Tenth Embodiment

Figure 18:
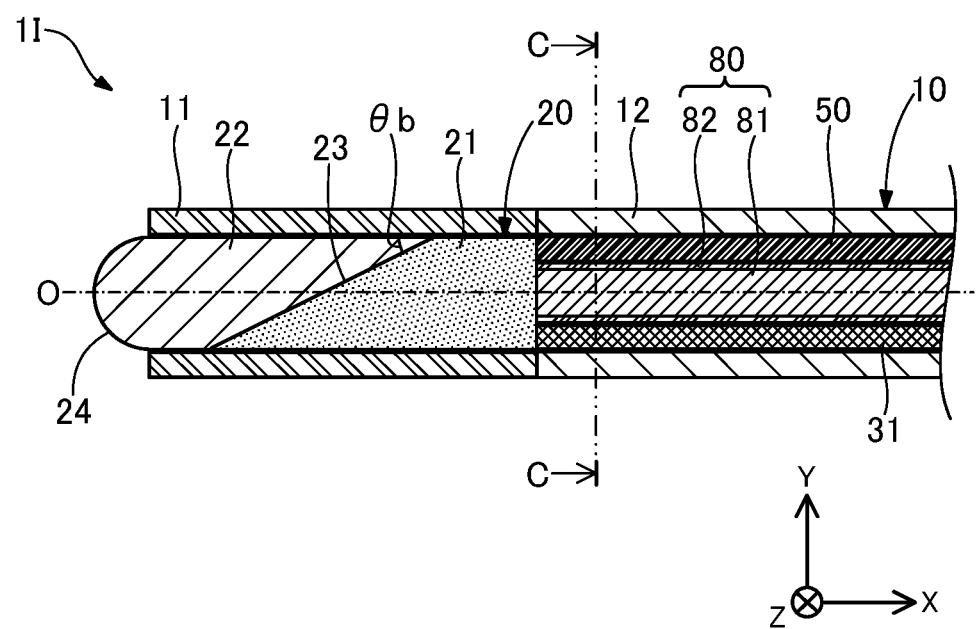
FIG. 18 is an explanatory diagram exemplifying a configuration of a light irradiation device of a tenth embodiment.
Figure 19:
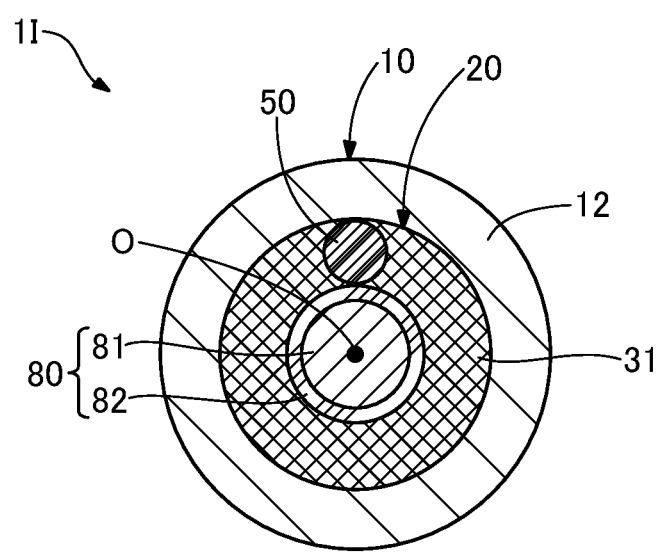
FIG. 19 is an explanatory diagram exemplifying a cross-sectional configuration along a line C-C in FIG. 18.

FIG. 18 is an explanatory diagram exemplifying a configuration of a light irradiation device 1I of a tenth embodiment. FIG. 19 is an explanatory diagram exemplifying a cross-sectional configuration along a line C-C in FIG. 18. The light irradiation device 1I of the tenth embodiment further includes a core 50 in the configuration of the first embodiment. The core 50 is a reinforcing member that prevents bending of the light irradiation device 1I. The core 50 is an elongated wire extending along the axis O and disposed side by side with the optical fiber 80 inside the main body portion 12 (FIG. 19). The core 50 may be formed of any hard resin material such as reinforced plastic (PEEK), or it may be formed of a stainless steel alloy such as SUS304 or SUS316, a super-elastic alloy such as a nickel-titanium alloy, a piano wire, or a radiolucent alloy such as a nickel-chromium alloy or a cobalt alloy.

As described above, the configuration of the light irradiation device 1I can be modified in various ways, and the light irradiation device 1I may include the reinforcing member (core 50) for preventing the bending of the light irradiation device 1I. One or multiple cores 50 may be provided. Further, the core 50 may be a solid wire as shown in the drawing or a hollow tubular body. With the light irradiation device 1I of the tenth embodiment as described above, the same effects as those of the above-mentioned first embodiment can be achieved. Further, according to the light irradiation device 1I of the tenth embodiment, by providing the core 50, the bending of the light irradiation device 1I can be prevented, and, in addition, the torque transmissibility and durability of the light irradiation device 1I can be improved.

Eleventh Embodiment

Figure 20:
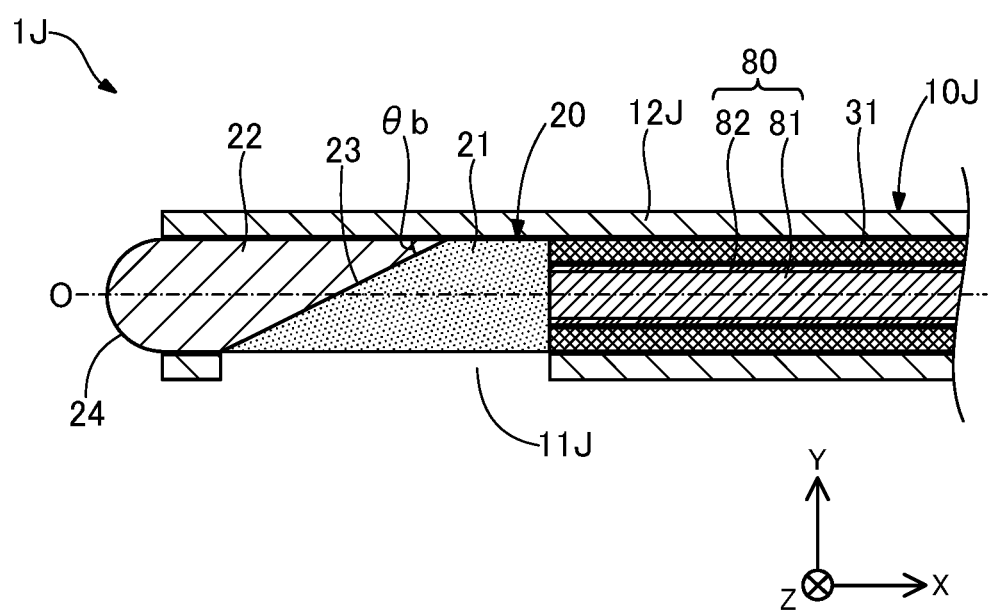
FIG. 20 is an explanatory diagram exemplifying a configuration of a light irradiation device of an eleventh embodiment.

FIG. 20 is an explanatory diagram exemplifying a configuration of a light irradiation device 1J of an eleventh embodiment. The light irradiation device 1J of the eleventh embodiment includes a shaft 10J instead of the shaft 10 in the configuration of the first embodiment. The shaft 10J includes a light transmitting portion 11J instead of the light transmitting portion 11 and a main body portion 12J instead of the main body portion 12. A distal side of the main body portion 12J covers a part of the outer peripheral surface of the optical path changing member 20 (specifically, the part excluding the light transmitting portion 11J). The light transmitting portion 11J is an opening formed in a part of the main body portion 12J on the distal side thereof covering the outer peripheral surface of the optical path changing member 20, through which the reflected light reflected by the boundary surface 23 passes. In the light irradiation device 1J, the reflected light reflected by the boundary surface 23 is emitted to the outside through the opening (i.e., the light transmitting portion 11J) of the main body portion 12J.

As described above, the configuration of the shaft 10J can be modified in various ways, and the light transmitting portion 11J may be the opening formed in the main body portion 12J. Further, instead of forming the opening in the main body portion 12J, the main body portion 12J may be formed of a light transmissive resin material, and a part of the main body portion 12J may function as the light transmitting portion 11J. Further, instead of forming the opening in the main body portion 12J, a thin part (part with a small thickness) may be formed in the main body portion 12J, and the thin part may function as the light transmitting portion 11J. With the light irradiation device 1J of the eleventh embodiment as described above, the same effects as those of the above-mentioned first embodiment can be achieved. Further, according to the light irradiation device 1J of the eleventh embodiment, the shaft 10J can be configured in various ways.

Twelfth Embodiment

Figure 21:
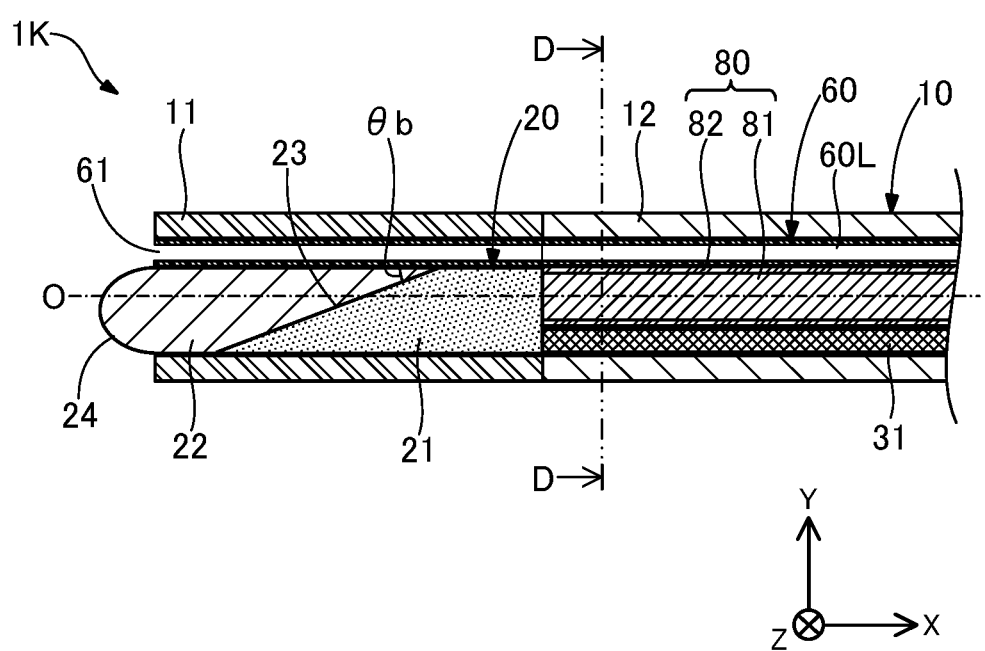
FIG. 21 is an explanatory diagram exemplifying a configuration of a light irradiation device of a twelfth embodiment.
Figure 22:
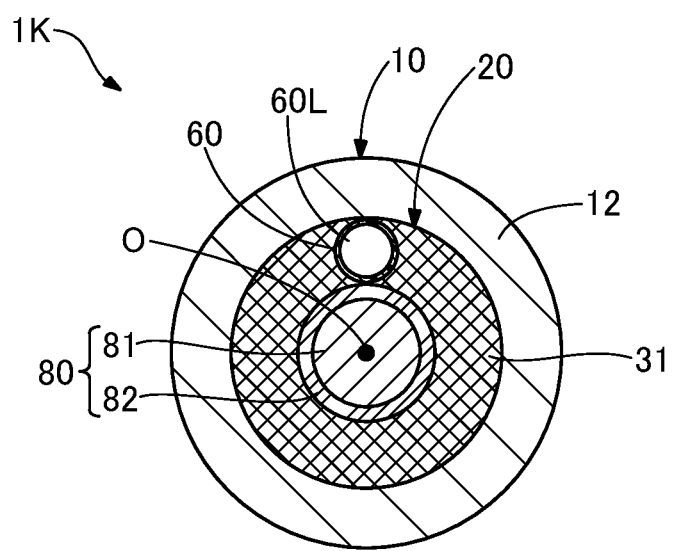
FIG. 22 is an explanatory diagram exemplifying a cross-sectional configuration along a line D-D in FIG. 21.

FIG. 21 is an explanatory diagram exemplifying a configuration of a light irradiation device 1K of a twelfth embodiment. FIG. 22 is an explanatory diagram exemplifying a cross-sectional configuration along a line D-D in FIG. 21. The light irradiation device 1K of the twelfth embodiment further includes an inner shaft 60 in the configuration of the first embodiment. The inner shaft 60 is a member that constitutes a device lumen 60L for inserting a combined device such as a guide wire into the light irradiation device 1K. The inner shaft 60 is a substantially cylindrical member that extends along the axis O and has a substantially constant outer diameter from the proximal side to the distal side. The inner shaft 60 is disposed side by side with the optical fiber 80 inside the light transmitting portion 11 and the main body portion 12 (FIG. 21). The inner shaft 60 preferably has anti-thrombogenicity, flexibility, and biocompatibility and can be formed of the same material as the main body portion 12, for example.

As described above, the configuration of the light irradiation device 1K can be modified in various ways and, the light irradiation device 1K may include the device lumen 60L. Although one device lumen 60L is shown in the example in FIG. 21, the light irradiation device 1K may include a plurality of the device lumens 60L. With the light irradiation device 1K of the twelfth embodiment as described above, the same effects as those of the above-mentioned first embodiment can be achieved. Further, according to the light irradiation device 1K of the twelfth embodiment, since the guide wire can be inserted into the device lumen 60L from a distal opening 61 of the device lumen 60L, the light irradiation device 1K can be easily delivered using the guide wire. As a result, the usability of the light irradiation device 1K can be improved.

Thirteenth Embodiment

Figure 23:
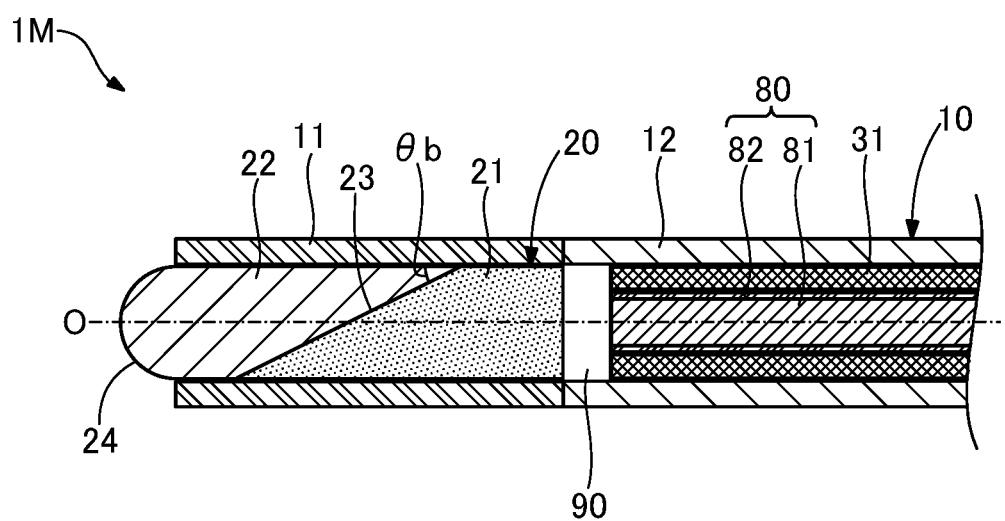
FIG. 23 is an explanatory diagram exemplifying a configuration of a light irradiation device of a thirteenth embodiment.

FIG. 23 is an explanatory diagram exemplifying a configuration of a light irradiation device 1M of a thirteenth embodiment. The light irradiation device 1M of the thirteenth embodiment further includes a spacing portion 90 in the configuration of the first embodiment. The spacing portion 90 is a portion having the light transmitting property, which is disposed between the optical fiber 80 and the optical path changing member 20 in the longitudinal direction of the light irradiation device 1M. The spacing portion 90 transmits the light entered from the optical fiber 80 to the optical path changing member 20. In the example in FIG. 23, the spacing portion 90 is a layer of the air. However, any material with the light transmitting property can be used for the spacing portion 90, and the spacing portion 90 can be formed of gas other than the air, liquid, a light transmissive resin, or the like. Further, it is preferable that both adjacent surfaces of the spacing portion 90 (i.e., a proximal surface of the proximal side member 21 and a distal surface of the core 81) are perpendicular to the central axis of the optical fiber 80.

As described above, the configuration of the light irradiation device 1M can be modified in various ways, and the spacing portion 90 may be disposed between the optical fiber 80 and the optical path changing member 20. In the illustrated example, the spacing portion 90 is disposed inside the main body portion 12. However, the spacing portion 90 may be disposed inside the light transmitting portion 11. With the light irradiation device 1M of the thirteenth embodiment as described above, the same effects as those of the above-mentioned first embodiment can be achieved. Further, according to the light irradiation device 1M of the thirteenth embodiment, when a material having relatively low rigidity such as gas or liquid is used for the spacing portion 90, a part provided with the spacing portion 90 can be easily deformed. This can improve the followability of the light irradiation device 1M inside the curved biological lumen.

Further, when a light transmissive resin or the like is used for the spacing portion 90, a rigidity gap of the light irradiation device 1M can be made smaller than a case where the spacing portion 90 is not provided. Specifically, in the case where the spacing portion 90 is not provided, the rigidity of the light irradiation device 1 changes at the boundary between the optical fiber 80 and the optical path changing member 20. On the other hand, in the case of the present embodiment, the rigidity of the light irradiation device 1M changes at the boundary between the optical fiber 80 and the spacing portion 90, and the rigidity of the light irradiation device 1M changes at the boundary between the spacing portion 90 and the optical path changing member 20. In this manner, by setting the rigidity of the spacing portion 90 between the rigidity of the optical fiber 80 and the rigidity of the optical path changing member 20, the rigidity of the light irradiation device 1M can be gradually changed. As a result, stress concentration when the light irradiation device 1M is bent can be reduced, and a damage to the light irradiation device 1M can be prevented. Further, since the deformable amount of the light irradiation device 1M when the light irradiation device 1M is bent can be increased, the followability of the light irradiation device 1M in the curved biological lumen can be improved.

Fourteenth Embodiment

Figure 24:
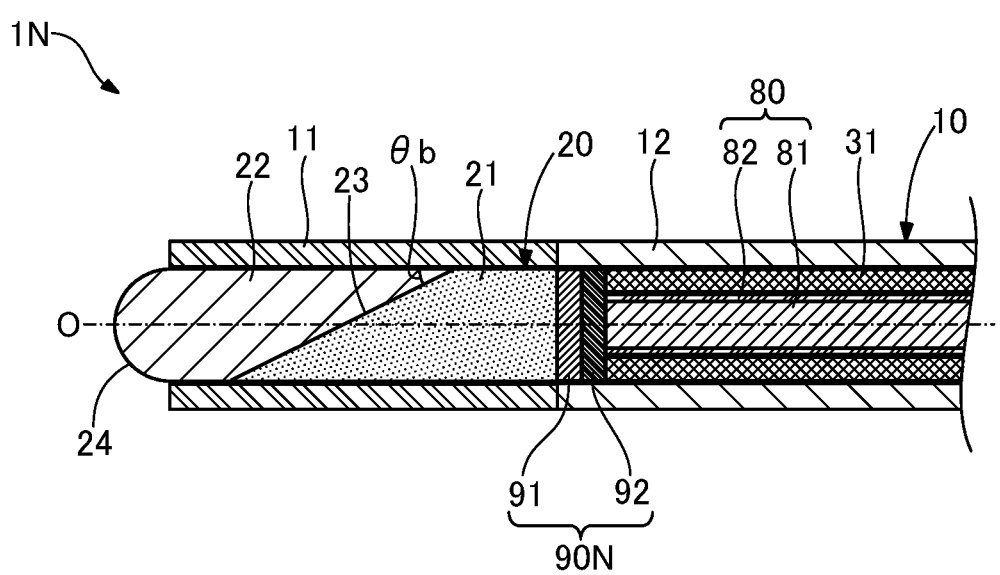
FIG. 24 is an explanatory diagram exemplifying a configuration of a light irradiation device of a fourteenth embodiment.

FIG. 24 is an explanatory diagram exemplifying a configuration of a light irradiation device 1N of a fourteenth embodiment. The light irradiation device 1N of the 14th embodiment includes a spacing portion 90N instead of the spacing portion 90 in the configuration of the thirteenth embodiment. The spacing portion 90N includes a first spacing portion 91 disposed adjacent to the optical path changing member 20 and a second spacing portion 92 disposed adjacent to the optical fiber 80.

The first spacing portion 91 and the second spacing portion 92 can be formed of any material with the light transmitting property. The first spacing portion 91 and the second spacing portion 92 may be formed of the air, gas other than the air, liquid, a light transmissive resin, or the like, as in the thirteenth embodiment. Note that, as described in the thirteenth embodiment, from the viewpoint of reducing the rigidity gap of the light irradiation device 1N, the rigidity of the first spacing portion 91 is preferably an intermediate value between the rigidity of the optical path changing member 20 and the rigidity of the second spacing portion 92. Similarly, the rigidity of the second spacing portion 92 is preferably an intermediate value between the rigidity of the first spacing portion 91 and the rigidity of the optical fiber 80.

In the illustrated example, the first spacing portion 91 and the second spacing portion 92 are each a substantially cylindrical member, and a boundary surface between the first spacing portion 91 and the second spacing portion 92 is perpendicular to the central axis of the optical fiber 80. However, the first spacing portion 91 and the second spacing portion 92 may be formed in any shape, and the boundary surface between the first spacing portion 91 and the second spacing portion 92 may be inclined relative to the vertical plane of the central axis of the optical fiber 80. With the light irradiation device 1N of the fourteenth embodiment as described above, the same effects as those of the above-mentioned first and thirteenth embodiments can be achieved.

Fifteenth Embodiment

FIG. 25 is an explanatory diagram exemplifying a configuration of a light irradiation system of a fifteenth embodiment. The light irradiation system includes the light irradiation device 1 described in the first embodiment and a catheter 2. The catheter 2 is formed in an elongated tubular shape and includes a main body portion 210, a distal tip 220, and a connector 240.

The main body portion 210 is an elongated member extending along the axis O and formed in a hollow, substantially cylindrical shape with both distal and proximal ends opened. The main body portion 210 includes a lumen 210L inside. A diameter Φ2 of the lumen 210L is larger than an outer diameter Φ1 of the light irradiation device 1. The lumen 210L functions as a guide wire lumen for inserting a combined device such as a guide wire into the catheter 2 when the catheter 2 is delivered. The lumen 210L functions as a device lumen for inserting the light irradiation device 1 into the catheter 2 after the catheter 2 is delivered. The main body portion 210 can be formed of a resin material or a metal material, like the light transmitting portion 11 of the light irradiation device 1.

The distal tip 220 is a member that is joined to the distal end of the main body portion 210 and advances through the biological lumen ahead of other members. The distal tip 220 has an outer shape whose diameter is reduced from the proximal side to the distal side in order to facilitate the advancement of the catheter 2 inside the biological lumen. A through hole 201 penetrating through the distal tip 220 in the direction of the axis O is formed in a substantially central part of the distal tip 220. In this configuration, a diameter Φ3 of the through hole 201 is smaller than the diameter Φ2 of the lumen 210L of the main body portion 210. Thus, at the boundary between the main body portion 210 and the distal tip 220, a step is formed by protrusion of an inner surface 220i of the distal tip 220. The through hole 201 is used when a guide wire (not shown) is inserted into the catheter 2. The outer diameter and the length of the distal tip 220 can be freely determined. The distal tip 220 can be formed of a flexible resin material, like the distal tip 32 of the light irradiation device 1.

The main body portion 210 is further provided with a light transmitting portion 239 and markers 231 and 232. The light transmitting portion 239 transmits the light inside the main body portion 210 to the outside. The light transmitting portion 239 is a hollow, substantially cylindrical member having an outer diameter that is substantially the same as the outer diameter of the main body portion 210 and an inner diameter that is substantially the same as the diameter Φ2 of the lumen 210L of the main body portion 210. In other words, the light transmitting portion 239 is disposed over the entire circumferential direction (YZ-axis direction) and transmits the light inside the main body portion 210 to the outside over the entire circumferential direction. The light transmitting portion 239 is joined to the main body portion 210 on the proximal side and the distal side. The light transmitting portion 239 can be formed of a transparent resin material having the light transmitting property, such as, for example, an acrylic resin, polyethylene terephthalate, or polyvinyl chloride.

The markers 231 and 232 function as an indicator indicating the position of the light transmitting portion 239. The marker 231 is disposed near a distal portion of the light transmitting portion 239 and functions as an indicator indicating the position of the distal portion of the light transmitting portion 239. The marker 232 is disposed near a proximal portion of the light transmitting portion 239 and functions as an indicator indicating the position of the proximal portion of the light transmitting portion 239. Each of the markers 231 and 232 is embedded in the outer surface of the main body portion 210 so as to surround the main body portion 210 in the circumferential direction. The markers 231 and 232 can be formed of a radiopaque resin or metal material.

The connector 240 is a member disposed on the proximal side of the catheter 2 and held by an operator. The connector 240 can be formed of any resin material or the like.

A method of using the light irradiation system of the fifteenth embodiment will be described. First, an operator inserts a guide wire into the biological lumen. Next, the operator inserts the proximal side of the guide wire into the lumen 210L from the through hole 201 of the catheter 2 shown in FIG. 25, so that the guide wire is protruded from the proximal end of the connector 240. Next, the operator pushes the catheter 2 along the guidewire into the biological lumen to deliver the light transmitting portion 239 of the catheter 2 to a target site for light irradiation. By inserting the guide wire into the lumen 210L in this manner, the operator can easily deliver the catheter 2 to the target site inside the biological lumen. Further, the operator can easily position the light transmitting portion 239 of the catheter 2 in the biological lumen by confirming the positions of the markers 231 and 232 disposed near the light transmitting portion 239 with an X-ray image. After that, the operator removes the guide wire from the catheter 2.

Next, the operator inserts the light irradiation device 1 from the proximal end of the connector 240 of the catheter 2. The operator pushes the light irradiation device 1 toward the distal side of the catheter 2 along the lumen 210L of the catheter 2. In the light irradiation device 1, the distal portion of the light transmitting portion 11 is brought into contact with the step of the inner surface 220i of the distal tip 220, so that the light transmitting portion 239 is positioned at a position covering the outer peripheral surface of the proximal side member 21 of the optical path changing member 20 through the light transmitting portion 11. After that, the operator turns on the light source 3. Laser light generated by the light source 3 enters the optical path changing member 20 from the optical fiber 80 of the light irradiation device 1 and is reflected by the boundary surface 23. The reflected light reflected by the boundary surface 23 is transmitted through the light transmitting portion 11, further transmitted through the light transmitting portion 239 of the catheter 2, and then emitted to the biological tissue from the lateral side of the light irradiation device 1 and the catheter 2.

As described above, the light irradiation device 1 may be used in combination with the catheter 2 including the light transmitting portion 239 that transmits the light from the light irradiation device 1 to the outside. The configuration of the catheter 2 shown in FIG. 25 is only an example and can be modified in various ways. Further, the light irradiation device 1 may be used in combination with other medical devices such as an endoscope. With the light irradiation system of the fifteenth embodiment as described above, the same effects as those of the above-mentioned first embodiment can be achieved. Further, according to the light irradiation system of the fifteenth embodiment, the light irradiation device 1 and the catheter 2 including the light transmitting portion 239 that transmits the light reflected by the boundary surface 23 of the light irradiation device 1 are separately provided, which can improve flexibility in device design and expand a range of procedures.

Modifications of Present Embodiment

The disclosure is not intended to be limited to the above-mentioned embodiments and can be implemented in various aspects without departing from the scope of the disclosed embodiments. For example, the following modifications can be made.

[First Modification]

In the above first to fifteenth embodiments, examples of the configurations of the light irradiation devices 1, 1A to 1K, 1M, and 1N have been described. However, the configuration of the light irradiation device 1 can be modified in various ways. For example, the outer peripheral surface of the shaft 10 may be coated with a hydrophilic or hydrophobic resin. This makes it possible to improve slidability of the light irradiation device 1 in the biological lumen. Further, the outer peripheral surface of the shaft 10 may be coated with an antithrombotic material such as heparin. This makes it possible to prevent a decrease in laser output due to adhesion of thrombus caused by irradiation of the laser light.

For example, the light irradiation device 1 may include an expansion/contraction portion that can be expanded/contracted in the radial direction. As the expansion/contraction portion, for example, a balloon formed by a flexible thin film or a mesh body in which wires are formed in a mesh shape can be used. The expansion/contraction portion can be provided on at least one of the distal and proximal sides of the light transmitting portion 11 of the light irradiation device 1. In this manner, after positioning the light irradiation device 1 inside the biological lumen, the light irradiation device 1 can be fixed inside the biological lumen by expanding the expansion/contraction portion. Further, in a case where a balloon is used as the expansion/contraction portion, it becomes possible to block the blood flow at a light irradiation site, thereby preventing the blood flow from blocking the light.

[Second Modification]

The configurations of the light irradiation devices 1, 1A to 1K, 1M, and 1N, and the catheter 2 of the first to fifteenth embodiments and the configurations of the light irradiation devices 1, 1A to 1K, 1M, and 1N of the above-mentioned first modification may be appropriately combined. For example, a light irradiation system may be configured by combining the light irradiation devices 1A to 1K, 1M, and 1N of the second to fourteenth embodiments and the catheter 2 of the fifteenth embodiment. For example, the optical path changing members 20A and 20B of the second and third embodiments may be applied to the light irradiation devices 1F to 1K, 1M and 1N having the configurations of the seventh to fourteenth embodiments. For example, the optical path changing members 20C to 20E of the fourth to sixth embodiments may be covered with the shaft 10 as in the first embodiment.

The aspects have been described above based on the embodiments and modifications. However, the embodiments described above as aspects are provided to facilitate understanding of the aspects and not to limit the aspects. The aspects may be modified and improved without departing from the spirit of the aspects and the scope of the claims, and equivalents thereof are included in the aspects. Further, unless the technical features are described as essential in the present specification, they may be omitted as appropriate.

What is claimed is:

1. A light irradiation device comprising:
an optical fiber; and
a light transmissive optical path changing member disposed on a distal side of the light irradiation device relative to the optical fiber and configured to change an optical path of light entering the optical path changing member from the optical fiber, wherein
the optical path changing member includes a proximal side member disposed on a proximal side of the optical path changing member and a distal side member disposed on a distal side of the optical path changing member,
the proximal side member and the distal side member are in contact with each other to form a boundary surface, the boundary surface being inclined relative to a vertical plane of a central axis of the optical fiber,
at least a part of the boundary surface that is irradiated with the light from the optical fiber is a flat surface inclined relative to the vertical plane, and
an inclination angle θb of the boundary surface satisfies the following expression:

$0 < \theta b \le \pi/2 + [\arcsin(NA/n1)] - [\arcsin(n2/n1)]$ where NA is a numerical aperture of the optical fiber, n1 is a refractive index of the proximal side member, n2 is a refractive index of the distal side member, and θb is an acute angle formed between the central axis of the optical fiber and the boundary surface in a longitudinal section of the optical path changing member.

2. The light irradiation device according to claim 1, wherein the inclination angle θb satisfies the following expression:

$0° < \theta b < 64°$, the numerical aperture NA satisfies the following expression:

$0.1 \le NA \le 0.5$, and the refractive index n1 and the refractive index n2 satisfy the following expression:

$1.3 \le n2 < n1 \le 2.0$.

3. The light irradiation device according to claim 2, wherein a distal portion of the distal side member is formed in a curved shape having a radius R.

4. The light irradiation device according to claim 2, wherein a region of an outer peripheral surface of the proximal side member, through which light reflected by the boundary surface passes, has a spherical shape.

5. The light irradiation device according to claim 2, further comprising a light transmissive spacing portion that is formed of a material with the light transmitting property, disposed between the optical fiber and the optical path changing member, and configured to transmit the light entering the optical path changing member from the optical fiber.

6. The light irradiation device according to claim 1, wherein a wavelength λ of the light entering the optical path changing member from the optical fiber satisfies the following expression:

$780$ nm $< \lambda < 1$ mm, the inclination angle θb satisfies the following expression:

$0° < \theta b < 79°$, the numerical aperture NA satisfies the following expression:

$0.1 \le NA \le 0.5$, and the refractive index n1 and the refractive index n2 satisfy the following expression:

$1.3 \le n2 < n1 \le 4.0$.

7. The light irradiation device according to claim 6, wherein a distal portion of the distal side member is formed in a curved shape having a radius R.

8. The light irradiation device according to claim 6, wherein a region of an outer peripheral surface of the proximal side member, through which light reflected by the boundary surface passes, has a spherical shape.

9. The light irradiation device according to claim 1, wherein a distal portion of the distal side member is formed in a curved shape having a radius R.

10. The light irradiation device according to claim 1, wherein a region of an outer peripheral surface of the proximal side member, through which light reflected by the boundary surface passes, has a spherical shape.

11. The light irradiation device according to claim 1, further comprising a light transmissive spacing portion that is formed of a material with the light transmitting property, disposed between the optical fiber and the optical path changing member, and configured to transmit the light entering the optical path changing member from the optical fiber.

12. A light irradiation system comprising:
the light irradiation device according to claim 1, and
a catheter into which the light irradiation device is configured to be inserted,
wherein the catheter includes a light transmitting portion that is disposed at a position covering an outer peripheral surface of the proximal side member and is configured to transmit the light reflected by the boundary surface when the light irradiation device is inserted into the catheter.

13. The light irradiation device according to claim 1, wherein
the proximal side member and the distal side member are made of different materials, and
each of the proximal side member and the distal side member has a uniform refractive index throughout.

* * * * *